(12) United States Patent
Etling

(10) Patent No.: US 8,342,447 B2
(45) Date of Patent: Jan. 1, 2013

(54) MORPHING CONTROL SURFACE TRANSITION

(75) Inventor: Keith A. Etling, Shiloh, IL (US)

(73) Assignee: The Boeing Company, Chicago, IL (US)

( * ) Notice: Subject to any disclaimer, the term of this patent is extended or adjusted under 35 U.S.C. 154(b) by 182 days.

(21) Appl. No.: 12/816,372

(22) Filed: Jun. 15, 2010

(65) Prior Publication Data

US 2011/0303796 A1    Dec. 15, 2011

(51) Int. Cl.
*B64C 9/00* (2006.01)
*B64C 5/10* (2006.01)

(52) U.S. Cl. ..................... 244/90 R; 244/215

(58) Field of Classification Search .......... 244/213–215, 244/99.2, 99.3, 130, 123.1
See application file for complete search history.

(56) References Cited

U.S. PATENT DOCUMENTS

| | | | | |
|---|---|---|---|---|
| 4,471,925 A | * | 9/1984 | Kunz | 244/130 |
| 5,222,699 A | * | 6/1993 | Albach et al. | 244/213 |
| 5,794,893 A | * | 8/1998 | Diller et al. | 246/213 |
| 5,810,291 A | | 9/1998 | Geiger | |
| 5,931,422 A | | 8/1999 | Geiger | |
| 5,941,480 A | | 8/1999 | Wille | |
| 6,015,115 A | | 1/2000 | Dorsett | |
| 6,027,074 A | | 2/2000 | Cameron | |
| 6,145,791 A | * | 11/2000 | Diller et al. | 244/215 |
| 6,164,598 A | * | 12/2000 | Young et al. | 244/212 |
| 6,173,924 B1 | * | 1/2001 | Young et al. | 244/215 |
| 6,173,925 B1 | | 1/2001 | Mueller | |
| 6,209,824 B1 | * | 4/2001 | Caton et al. | 244/213 |
| 6,227,498 B1 | | 5/2001 | Arata | |
| 6,349,903 B2 | * | 2/2002 | Caton et al. | 244/213 |
| 6,375,122 B1 | | 4/2002 | Cameron | |
| 6,575,407 B2 | | 6/2003 | McCallum | |
| 7,108,231 B2 | | 9/2006 | Perez-Sanchez | |
| 7,850,119 B2 | * | 12/2010 | Martin Hernandez | 244/131 |
| 2001/0006207 A1 | * | 7/2001 | Caton et al. | 244/213 |

* cited by examiner

*Primary Examiner* — Tien Dinh
*Assistant Examiner* — Michael A Fabula
(74) *Attorney, Agent, or Firm* — Novatech IP Law; Sean O'Neill; James Poole

(57) ABSTRACT

A transition section forms a continuous contour across a gap between a pair of structures. The transition section comprises at least one rib mounted within the gap and being pivotable relative to the structures. A tip may be mounted to an aft end of the rib and may be rotatable about a tip axis. A skin panel may extend between the structures and may at least partially cover the tip. The skin panel may be deformable during pivoting of the rib such that the tip may rotate into substantial alignment with the skin panel.

25 Claims, 24 Drawing Sheets

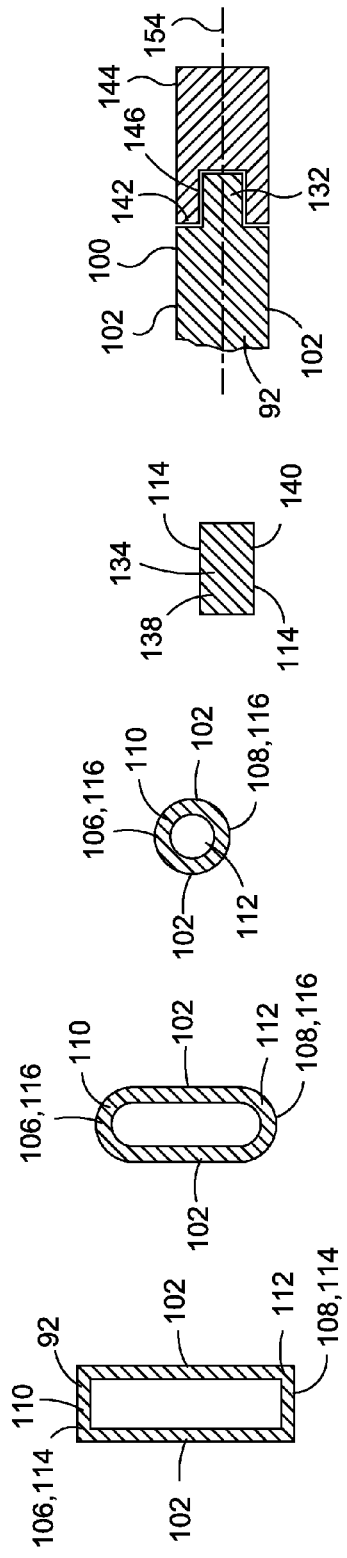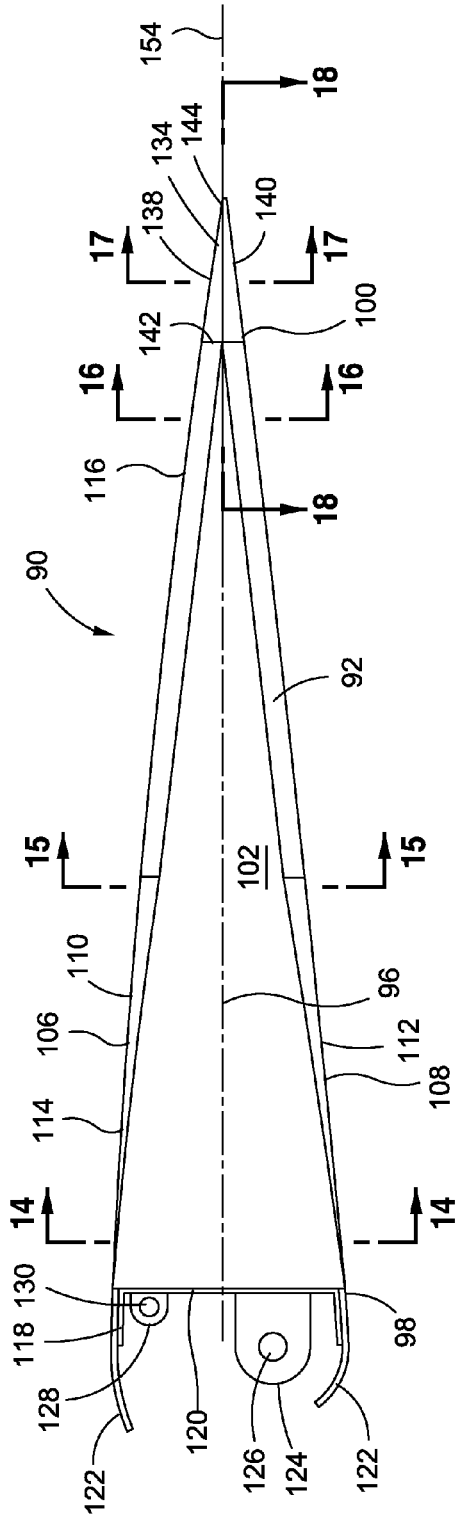

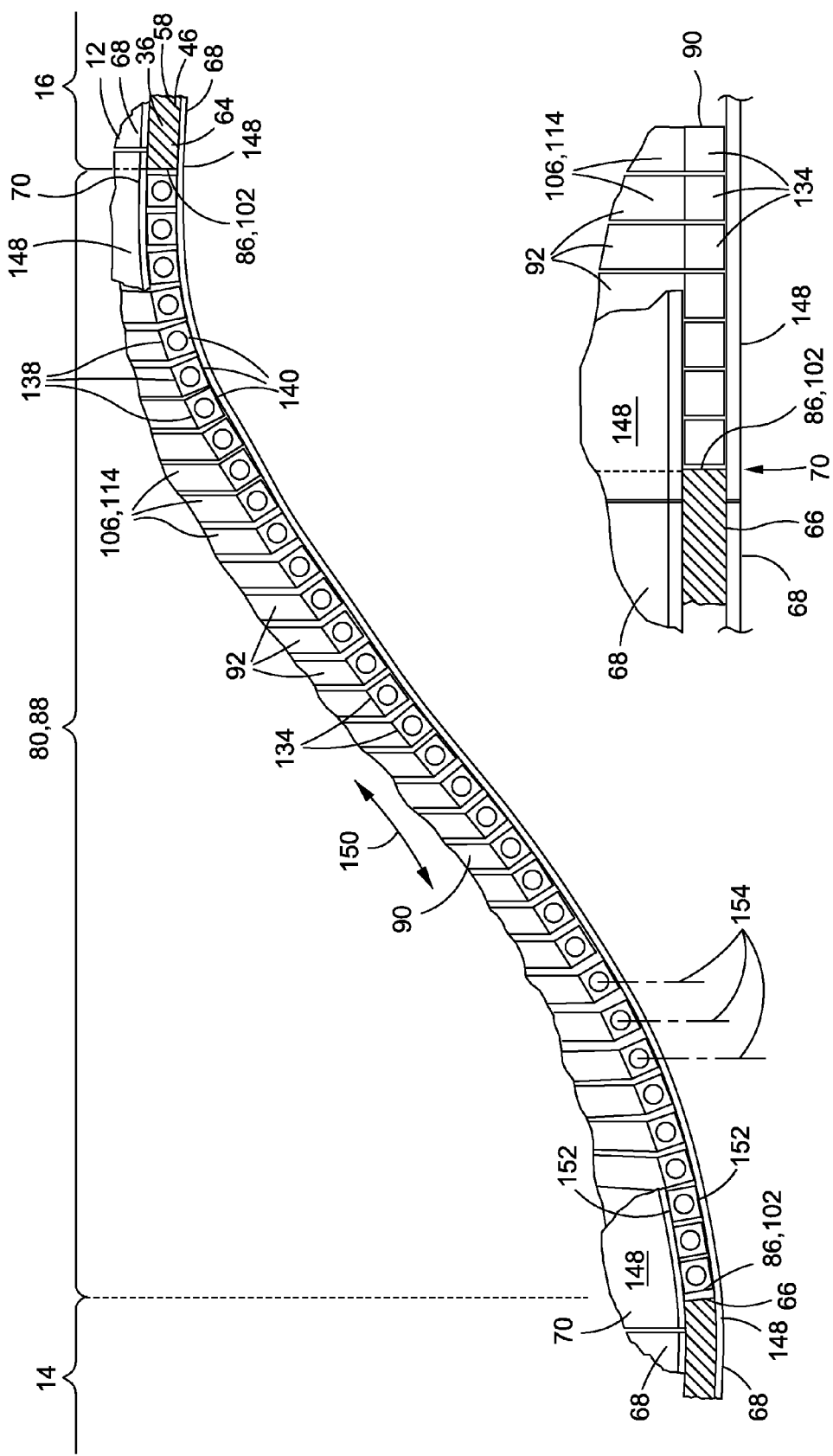

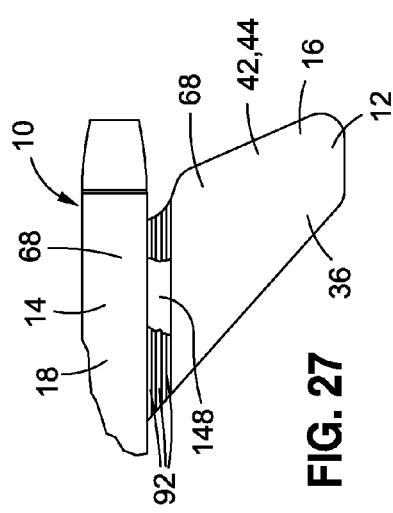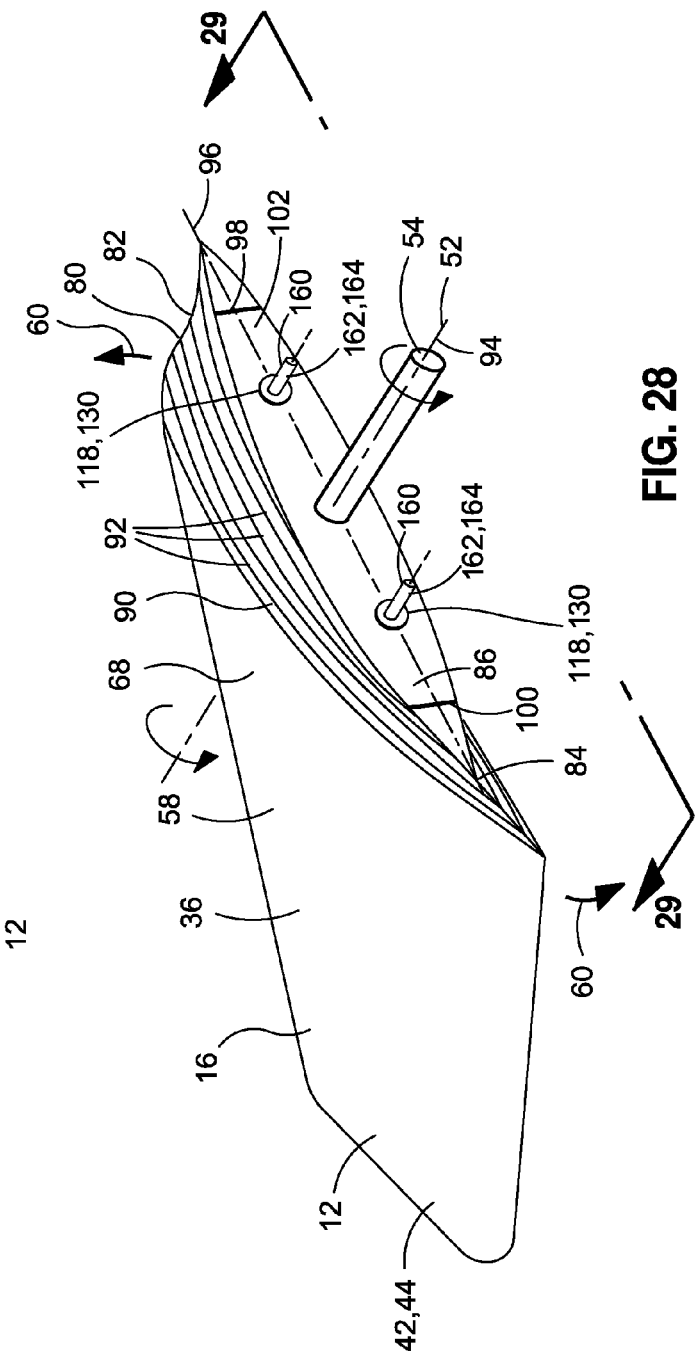

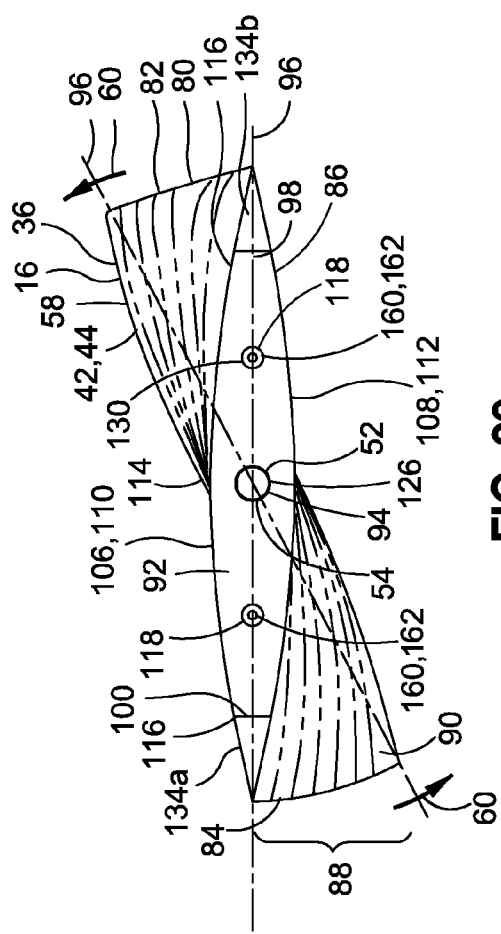
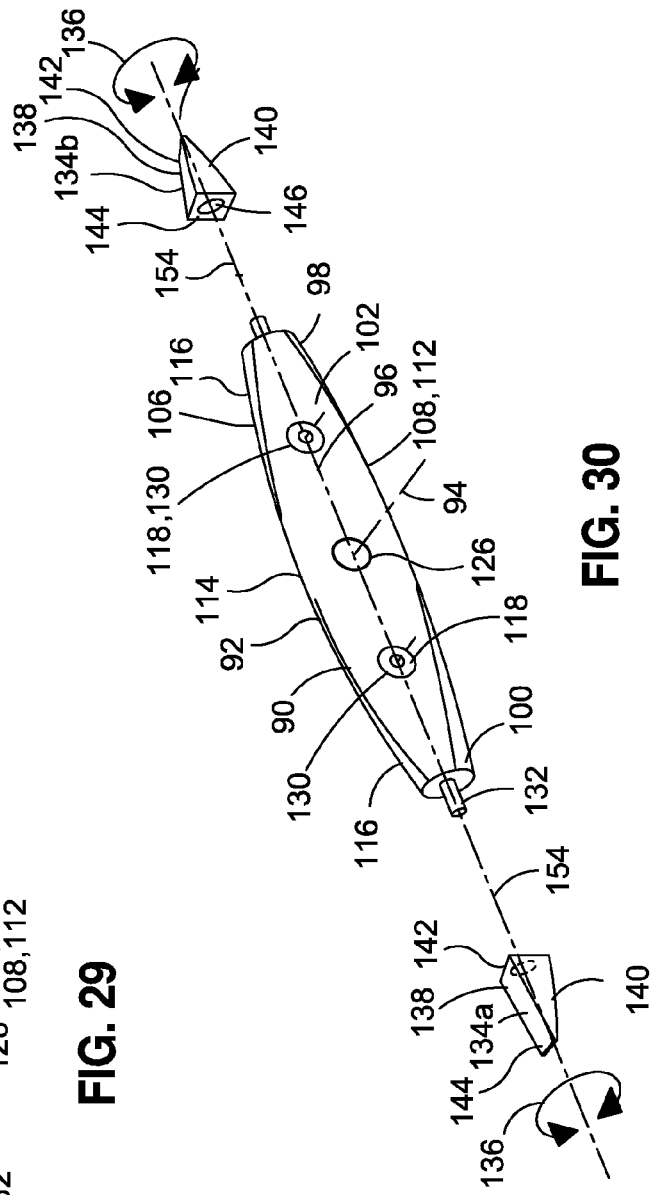
FIG. 29
FIG. 30

MORPHING CONTROL SURFACE TRANSITION

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to aerodynamics and, more particularly, to movable control surfaces as may be used for effecting flight control of an aircraft.

BACKGROUND

Conventional aircraft typically include a variety of movable aerodynamic devices for controlling the pitch, yaw and roll of the aircraft and for altering the lift characteristics of the aircraft. For example, fixed wing aircraft may include ailerons mounted to the trailing edge of the wings for roll control of the aircraft. The wings may also include flaps or slats mounted to the leading edge of the wings and which may be deployed or deflected downwardly from the wings during certain phases of flight in order to maintain airflow over the wing at high angles of attack.

Flaps may be also mounted to the trailing edges of the wings to increase the amount of lift generated by the wings when the aircraft is moving through the air at relatively slow speeds. Trailing edge flaps are typically deflected downwardly during takeoff to increase lift and are then retracted during the cruise portion of a flight. The flaps may again be deflected downwardly during the approach and landing phases of the flight to reduce the landing speed of the aircraft.

Although generally effective for reducing the landing speed of an aircraft, the deflection of conventional flaps may produce several undesirable effects. Such undesirable effects may be attributed to gaps that are created between the side edges of the deployed flaps and the wings. For example, the flow of air around the relatively sharp side edges of a deflected flap may result in formation of vortices along the side edges. Such vortices may increase the aerodynamic drag of the flap which may reduce the aerodynamic efficiency of the wing. The vortices may also cause vibration and flutter in the flap which may have an undesirable effect on the flap actuation mechanism.

Even further, vortices that may form along the side edge of a deflected flap may generate a significant amount of noise. Although flap noise may have minimal impact when the aircraft is at high altitudes or is flying over unpopulated areas, the noise generated by deployed flaps may have a greater impact when the aircraft is near populated areas located underneath the landing pattern of an airport. In this regard, flap noise may comprise a significant portion of the overall noise generated by the aircraft during the approach and landing phases of flight when the engines are typically idling.

As can be seen, there exists a need in the art for a system and method for minimizing or eliminating gaps occurring between the side edges of a flap and a wing when the flap is deflected.

BRIEF SUMMARY

The above-noted needs associated with control surfaces are addressed by the system and method disclosed herein wherein a transition section is provided between a movable structure and a fixed structure or between a pair of movable structures. The transition section provides a continuous contour between the structures during relative deflection thereof. For example, the transition section may be installed between a movable structure such as a leading edge flap which may be mounted to a fixed structure such as a wing. The transition section is not limited to implementation on an aircraft but may be applied to any vehicular or non-vehicular application, without limitation.

In an embodiment, the transition section may form a continuous contour across a gap that may be formed between a pair of structures such as a movable structure and a fixed structure. The transition section may comprise at least one rib which may be mounted within the gap and which may be pivotable relative to the structures. The transition section may include at least one tip which may be mounted to the rib such as to an aft end of the rib. The tip may be rotatable about a tip axis.

The transition section may include a skin panel which may extend between the structures and may at least partially cover the tip and/or rib. At least a portion of the skin panel may be resiliently deformable and/or stretchable during pivoting of the rib. For example, the skin panel may be deformable or stretchable at the tip of the rib. The tip may rotate about the tip axis during deformation of the skin panel such that the tip is maintained in alignment with the skin panel during relative deflection of the structures.

In a further embodiment, an aircraft may comprise a transition section forming a continuous contour across a gap between a pair of structures such as a movable structure and a fixed structure. The transition section may comprise a plurality of ribs mounted within the gap wherein each rib may be pivotable in response to relative deflection of the structures. A tip may be mounted to an aft end of each one of the ribs and may be rotatable about a tip axis. A skin panel may be extended between the structures such that the skin panel partially covers the tip and is elastically deformable during pivoting of the ribs such that the tips of each rib rotate to maintain alignment of the tip with the skin panel during relative deflection of the structures.

Also disclosed is a methodology comprising one or more operations or steps for controlling airflow over a structure. The methodology may comprise the steps of installing a transition section between a pair of structures. The transition section may include at least one pivotable rib which may have a tip mounted to the rib aft end and which may be at least partially covered by a skin panel that may extend between the structures. The methodology may comprise deflecting the structures relative to one another and pivoting the rib during the relative deflection of the structures. The methodology may further include deforming the skin panel during pivoting of the ribs and rotating the tips of each one of the ribs about a tip axis in correspondence with the deforming of the skin panel such that the tips are maintained in alignment with the skin panel during relative deflection of the structures.

In a further embodiment, the methodology may comprise one or more operations or steps for forming a movable structure. The methodology may comprise the step of installing at least one rib between the movable structure and a fixed structure or between a pair of movable structures. The methodology may further include mounting the rib such that the rib is pivotable about a rib pivot axis. A tip may be mounted to a rib aft end of the rib such that the tip is rotatable about a tip axis. The tip axis may be oriented in substantially non-parallel relation to the rib pivot axis. The methodology may comprise covering at least a portion of the tip with an elastic skin panel to form a substantially continuous contour extending between the structures.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 13 is a side view illustration of one of the ribs and a tip of the transition section;

FIG. 14 is a cross section of the rib taken along line 14-14 of FIG. 13 and illustrating the rib upper and lower edges having a generally planar shape;

FIG. 15 is a cross section of the rib taken along line 15-15 of FIG. 13 and illustrating the rib upper and lower edges having a generally rounded shape;

FIG. 16 is a cross section of the rib taken along line 16-16 of FIG. 13 and illustrating the generally rounded shape of the rib upper and lower edges;

FIG. 17 is a cross section of the tip taken along line 17-17 of FIG. 13 and illustrating the tip upper and lower edges having a generally planar shape;

FIG. 18 is a cross section of the rib and tip taken along line 18-18 of FIG. 13 and illustrating a stud of the rib aft end extending into the tip;

FIG. 23 is a cross section of the transition section taken along line 23-23 of FIG. 20 and illustrating the transition section in a deflected position and the rotation of the tips relative to the ribs;

FIG. 24 is an illustration of the transition section in an undeflected position and illustrating the tips being generally aligned with the ribs;

FIG. 27 is a top view of the horizontal stabilizer taken along line 27-27 of FIG. 26 illustrating the transition section extending from the leading edge to the trailing edge of the horizontal stabilizer;

FIG. 28 is a perspective illustration of the horizontal stabilizer and illustrating the transition section during deflection of the horizontal stabilizer;

FIG. 29 is a side view illustration of the transition section taken along line 29-29 of FIG. 28 and illustrating the continuous contour formed in the transition section when the horizontal stabilizer is deflected;

FIG. 30 is an exploded perspective illustration of an embodiment of the rib assembly having a forward tip and an aft tip mounted on opposing ends of the rib;

DETAILED DESCRIPTION

Figure 1:
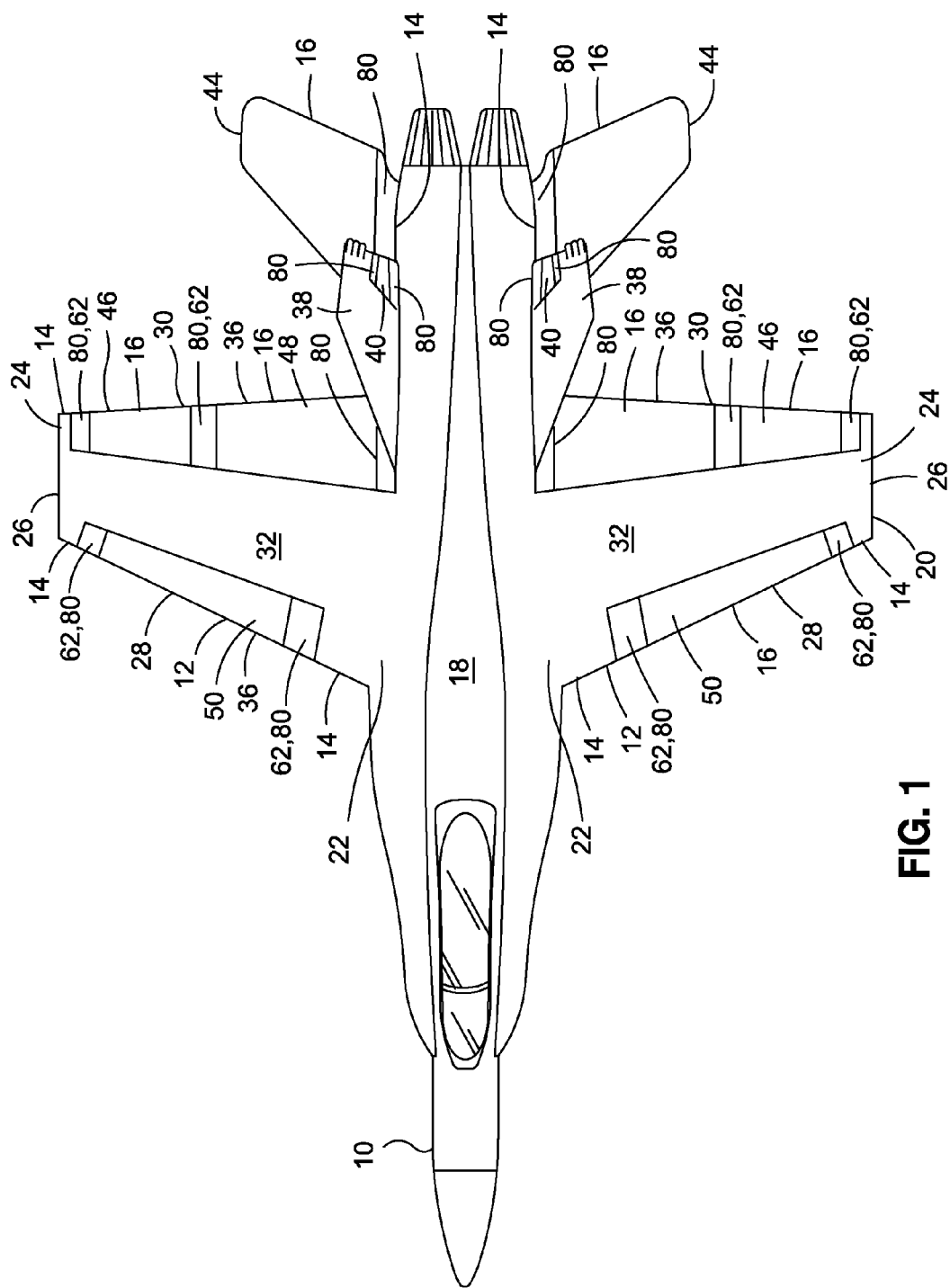
FIG. 1 is a top view of an aircraft having one or more control devices or movable structures mounted to the fixed structure of the aircraft and including transition sections installed within the gaps between the movable structures and the fixed structure or between a pair of movable structures.
Figure 2:
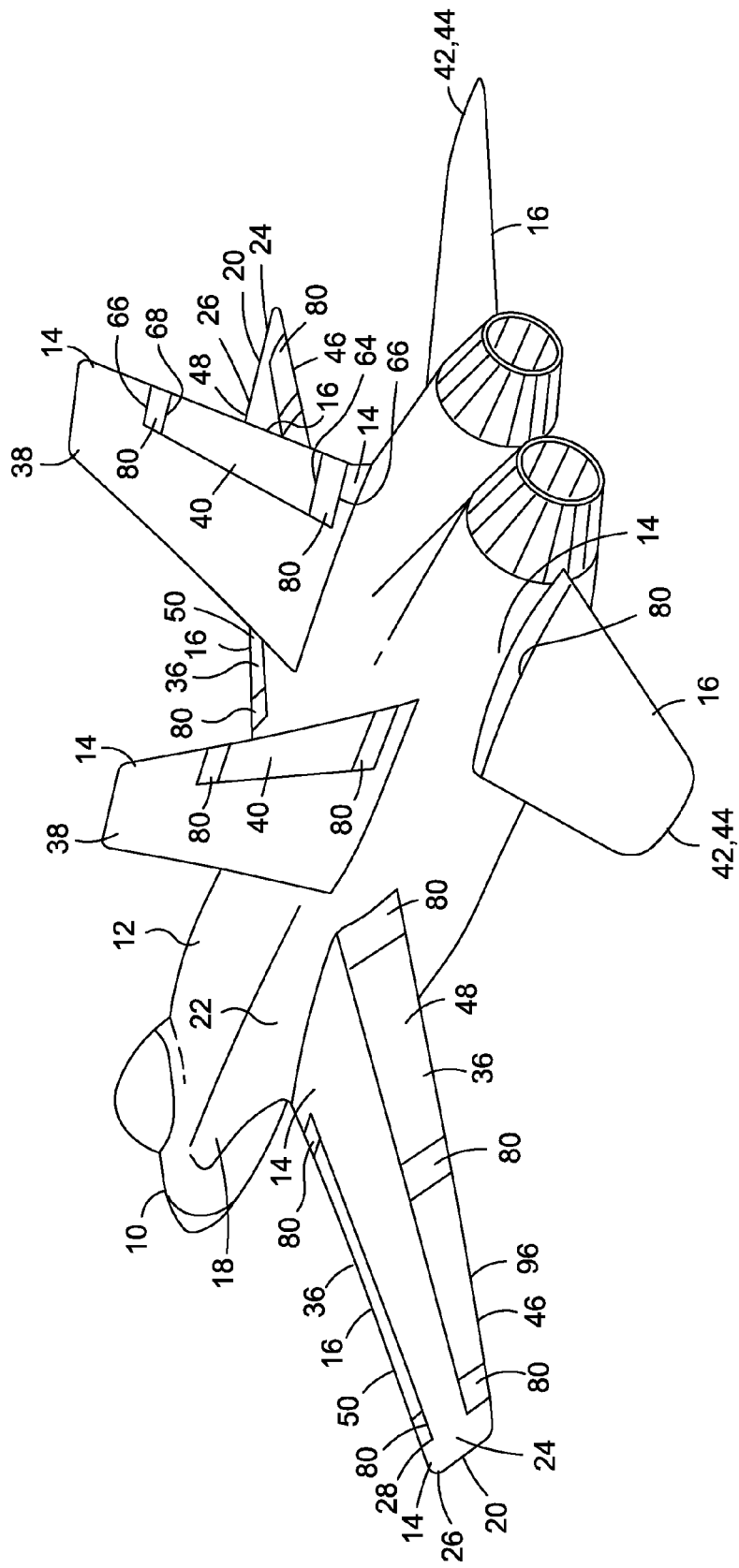
FIG. 2 is an aft perspective illustration of the aircraft having a plurality of transition sections installed between the structures.

Referring now to the drawings wherein the showings are for purposes of illustrating preferred and various embodiments of the disclosure, and not for limiting the disclosure, shown in FIGS. 1-2 are illustrations of an aircraft 10 having a plurality of movable structures 16. The movable structures 16 may comprise aerodynamic control devices 36 that may be mounted at any one of a variety of locations on the aircraft 10.

For example, the movable structures 16 may comprise ailerons 46 mounted to the fixed structure 14 of the aircraft 10 wing 20 at the wing trailing edges 30. Similarly, the aircraft 10 may include movable structures 16 comprising slats or flaps 50 that may be mounted to the leading edge 28 of the wing 20. The movable structure 16 may further comprise flaps 48 that may be mounted to the trailing edge 30 of the wing 20.

Advantageously, a transition section 80 may be mounted between the movable structures 16 (i.e., the ailerons 46, trailing edge flaps 48, leading edge flaps 50, etc.) and a fixed structure 14 (e.g., the wing 20) to provide a continuous contour 88 (FIG. 5) between the movable structure 16 and the fixed structure 14. For example, FIG. 1 illustrates the wings 20 of the aircraft 10 having a flap 50 (i.e., movable structure 16) mounted to the wing leading edge 28 (i.e., fixed structure 14). When the flap 50 is deployed from an undeflected position 56 (FIG. 3) to a deflected position 58 (FIG. 5), the transition sections 80 maintain continuity between the side edge 64 (FIG. 4) of the flap 50 and the side edge 66 of the wing 20.

Alternatively, a transition section 80 may be mounted between a pair of movable structures 16 to provide a continuous contour 88 between the movable structures 16 when at least one of the movable structures 16 is deflected. For example, the wing trailing edge 30 may include an aileron 46 and a trailing edge flap 48 mounted in side-by-side arrangement on the wing trailing edge 30. As can be seen in FIGS. 1 and 2, a transition section 80 may be installed between the side edge 64 (FIG. 4) of the flap 48 and the side edge 64 of the aileron 46.

In this regard, the present disclosure contemplates the installation of a transition section 80 between any pair of structures such as between a fixed structure 14 and a movable structure 16 or between a pair of the movable structures 16. Furthermore, the transition section 80 may be installed at any location on the aircraft 10. For example, the aircraft 10 in FIGS. 1 and 2 may include vertical or canted stabilizers 38 for providing directional yaw control for the aircraft 10. Each one of the vertical stabilizers 38 may include a rudder 40 which may be mounted on the trailing edge of the vertical stabilizer 38. The rudder 40 may include opposing side edges 64 (FIG. 4) to which a corresponding transition section 80 may be mounted to provide a continuous contour 88 (FIG. 5) along the length of the trailing edge of the vertical stabilizer 38 and rudder 40.

Referring briefly to FIGS. 2 and 28, in an embodiment, the transition section 80 may be implemented on all-moving control devices 36 or movable structures 16 such as an all-moving horizontal stabilizer 42/elevator 44 (i.e., stabilator) extending outwardly from the fuselage 18 of the aircraft 10. As described in greater detail below, the horizontal elevator 44 may comprise a unitary movable structure 16 that may be pivotable about a single structure pivot axis 52 (FIG. 28) to provide pitch control to the aircraft 10. The transition section 80 can be seen as being mounted between the inboard 22 portion of the horizontal stabilizer 42 and the fuselage 18 (i.e., fixed structure 14). The transition section 80 extends from the leading edge 82 to the trailing edge 84 of the horizontal stabilizer 42 such that when the all-moving horizontal stabilizer 42 is deflected or pivoted about the structure pivot axis 52, the transition section 80 deforms to provide a continuous contour 88 (FIG. 29) between the fuselage 18 and the horizontal stabilizer 42. In this manner, the transition section 80 prevents the formation of gaps between the side edges 64, 66 of the horizontal stabilizer 42 and the fuselage 18.

Referring to FIGS. 1-2, advantageously, the installation of the transition sections 80 to any one of the above-mentioned control devices 36 may reduce flow separation that may otherwise occur with conventional control devices or control surfaces. In this manner, the transition section 80 may improve the aerodynamic effectiveness and efficiency of the aircraft 10 by filling the gaps 62 that would otherwise occur at the side edges 64 (FIG. 4) of the control devices 36 when the control devices 36 are deflected. In this manner, the transition section 80 may reduce or eliminate the occurrence of noise-generating vortices.

Figure 9:
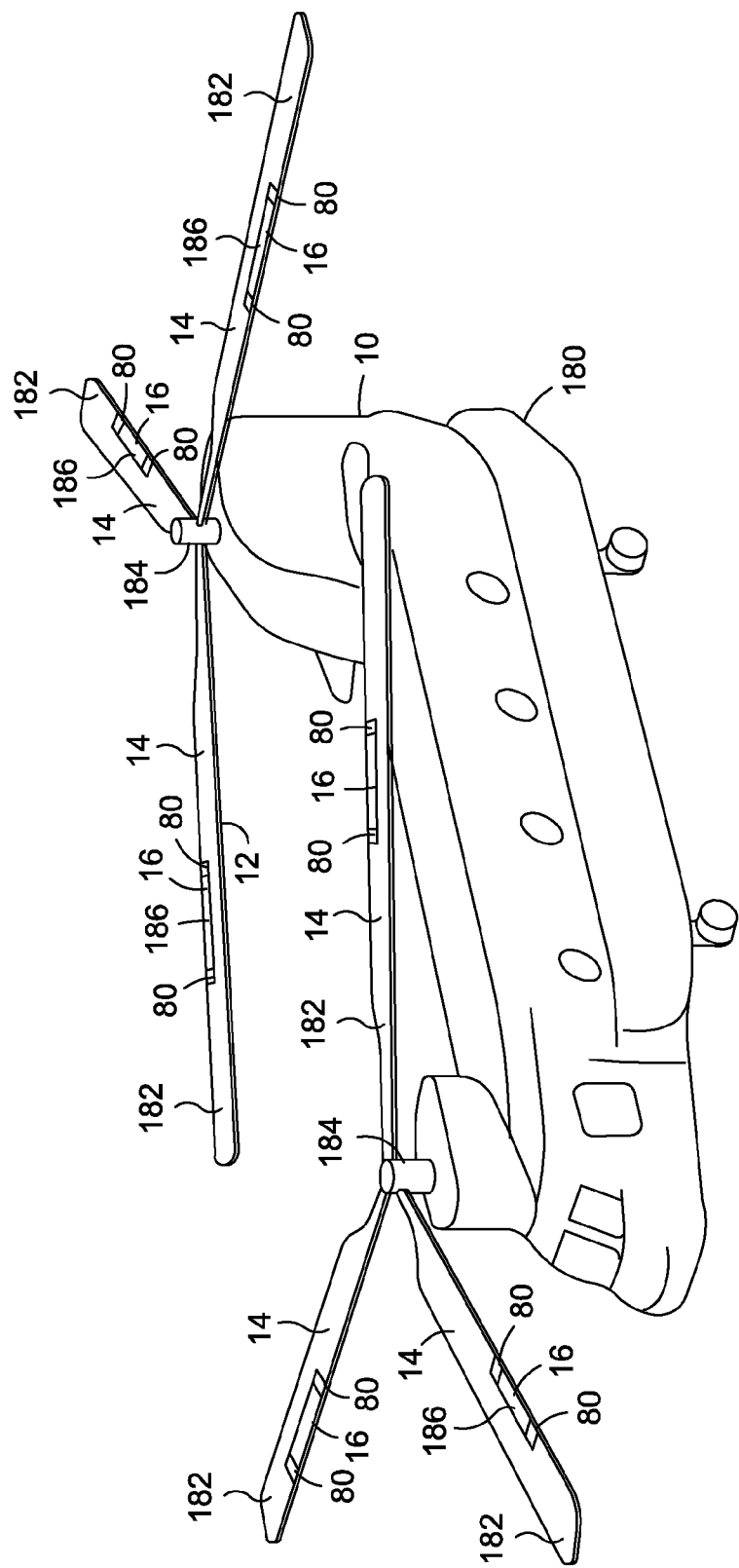
FIG. 9 is a perspective illustration of a rotorcraft having rotor blades and illustrating control tabs mounted on the rotor blades with transition sections on opposing sides of the control tabs.

It should also be noted that the transition section 80 as disclosed herein is not limited to installation on fixed wing aircraft 10 as illustrated in FIGS. 1 and 2. For example, the transition section 80 may be implemented on any type of aircraft including rotorcraft 180 such as that which is illustrated in FIG. 9. In an embodiment illustrated in FIG. 9, the transition section 80 may be installed on opposite sides of one or more control tabs 186 that may be mounted on the trailing edges of the main rotor blades 182 of a rotorcraft 180. The control tabs 186 may facilitate changes in pitch of the main rotor blades 182 for directional control and/or altitude control of the rotorcraft 180. The transition sections 80 may eliminate the occurrence of vortices that may otherwise be created by the exposed side edges of the control tabs 186 during deflection of the control tabs 186. In this manner, the transition sections 80 may improve the aerodynamics of the rotor blades 182 while minimizing the noise that would otherwise occur when a trailing rotor blade rotates through the vortices created by the leading rotor blade.

The transition section 80 is also not limited to implementation on fixed wing aircraft 10 or rotorcraft 180 but may be implemented on any vehicular application including any air vehicle, launch vehicle (i.e., rocket), missile or projectile having movable structures 16 such as control surfaces. Further in this regard, the transition section 80 may be implemented on any marine, land, air or space vehicle, without limitation. Even further, the transition section 80 may be implemented on any non-vehicular application including any building, structure, assembly, subassembly, system, component or device, without limitation. For example, the transition section 80 may be implemented on a wind turbine or a windmill such as for generating electricity. The transition section 80 may further be implemented on any fluid tunnel, wind tunnel or shock tunnel as may be used for testing the hydrodynamics or aerodynamics of any object or structure.

Figure 3:
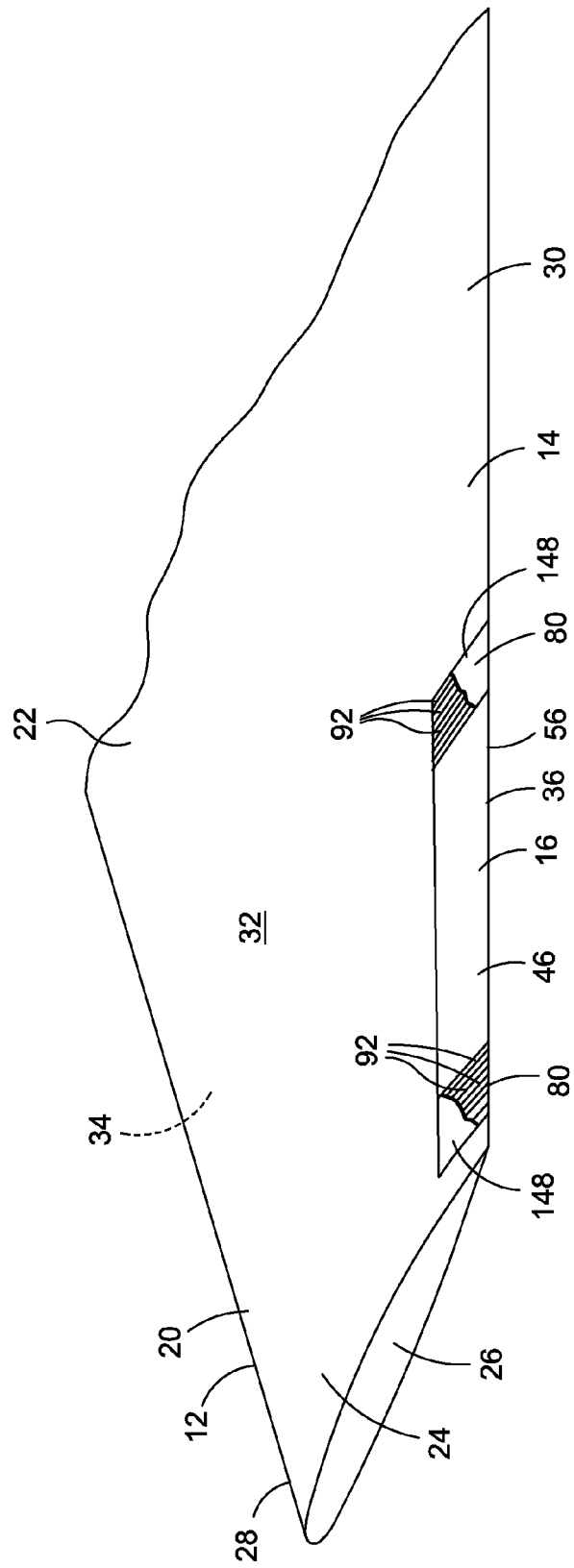
FIG. 3 is an aft perspective illustration of the fixed structure of an aircraft wing having a pair of transition sections mounted on opposing sides of an aileron.
Figure 4:
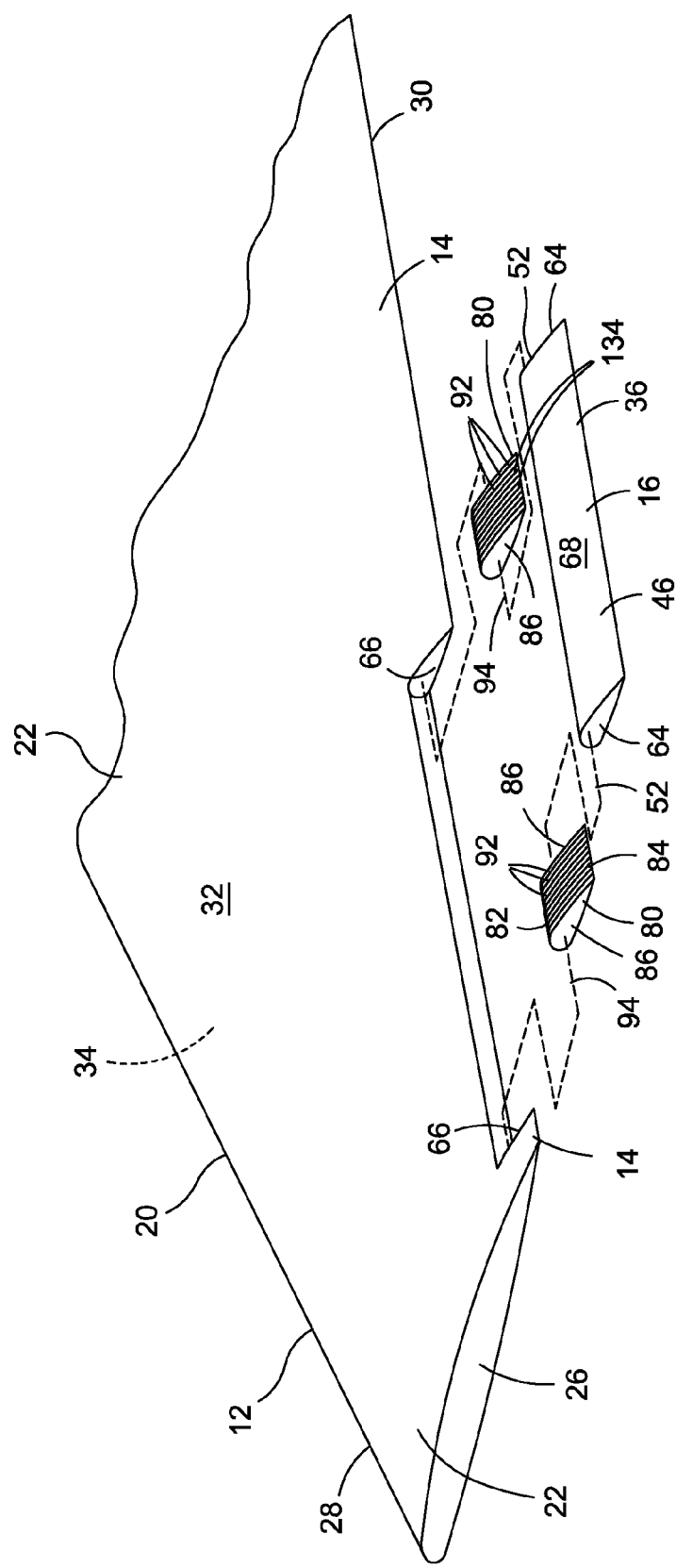
FIG. 4 is a partially exploded perspective illustration of the wing of FIG. 3 and illustrating the interconnectivity of the aileron and transition sections.

Referring particularly now to FIGS. 3 and 4, shown is an enlarged portion of the wing 20 of the aircraft 10 illustrated in FIGS. 1 and 2. As can be seen, the transition section 80 is illustrated as being installed on opposing sides of a movable structure 16 comprising an aileron 46 which is illustrated in an undeflected position 56. The aileron 46 comprises one of a variety of different types of control devices 36 which may be mounted to the wing 20 such as along the trailing edge 30 thereof. The aileron 46 is illustrated as being installed toward an outboard 24 portion of the wing 20 adjacent the wing tip 26. However, the aileron 46 may comprise one of a variety of different types of control devices 36 that may be installed at any location along the wing trailing edge 30.

Referring still to FIGS. 3 and 4, shown is the wing 20 of an aircraft 10 having the aileron 46 mounted to the wing trailing edge 30. The aileron 46 comprises the movable structure 16 and the wing 20 comprises the fixed structure 14. The transition section 80 advantageously forms a continuous contour 88 (FIG. 5) across a gap 62 (FIG. 1) that would otherwise be formed between the movable structure 16 of the aileron 46 and the fixed structure 14 of the wing 20. The transition section 80 provides a means for maintaining an uninterrupted surface or continuous contour 88 across the wing upper surface 32 and the skin panel 148 (FIG. 3) which may cover the transition section 80. Likewise, the transition section 80 provides a continuous contour 88 between the wing lower surface 34 and the skin panel 148 on an underside of the transition section 80.

Referring to FIG. 4, the aileron 46 and transition sections 80 are shown exploded away from the wing 20 to illustrate the interconnectivity of the components. The aileron 46 may be pivotable about the structure pivot axis 52 which may be common with a rib pivot axis 94 about which the transition section 80 may pivot. More specifically, the transition section 80 may comprise at least one rib 92 and, more preferably, a plurality of ribs 92 which may be independently pivotable relative to one another. As can be seen in FIG. 4, the transition section 80 may be mounted between the aileron 46 side edge 64 and the side edge 66 of the fixed structure 14 of the wing 20. The ribs 92 that make up the transition section 80 are pivotable relative to one another and relative to the fixed structure 14 (e.g., the wing 20). The ribs 92 may also be independently pivotable relative to a pair of movable structures 16 between which the transition section 80 may be mounted.

Figure 5:
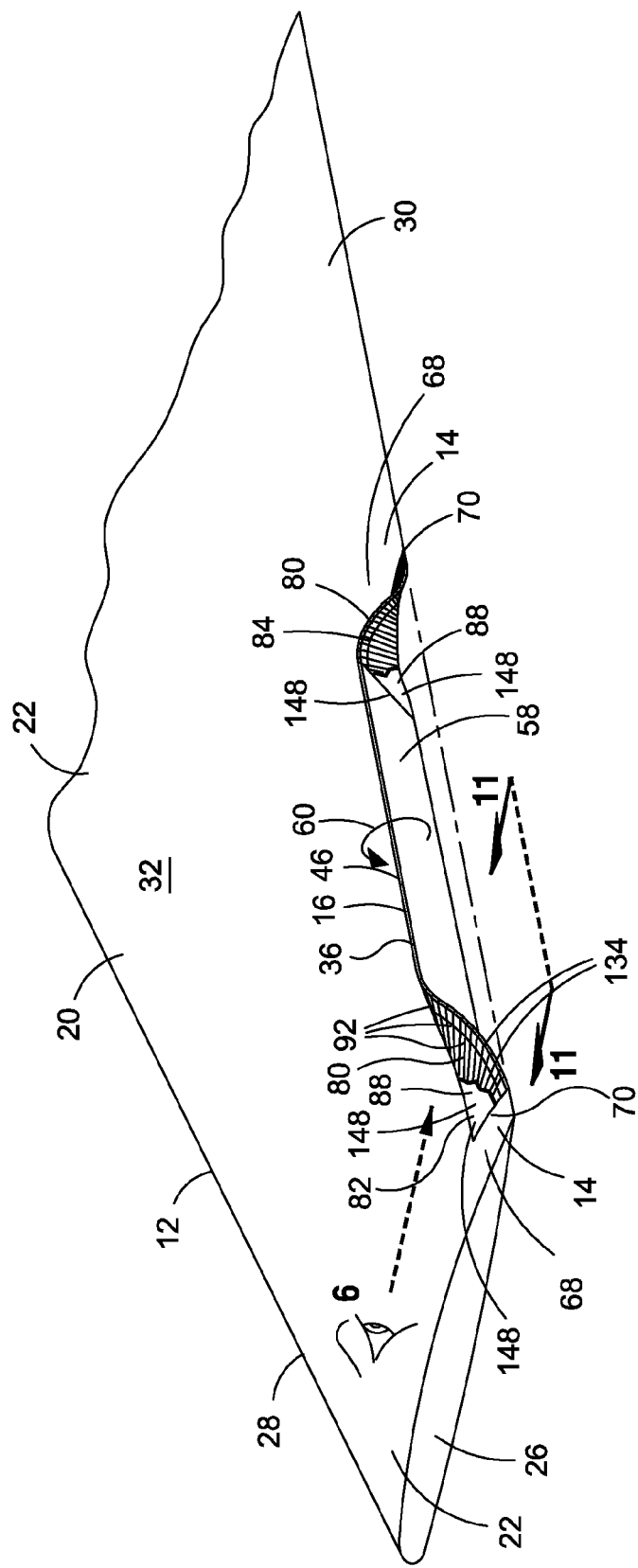
FIG. 5 is an enlarged perspective illustration of the wing illustrating the aileron of FIG. 4 in an upwardly deflected position and further illustrating the transition sections forming a continuous contour between the deflected aileron and the fixed structure of the wing.
Figure 6:
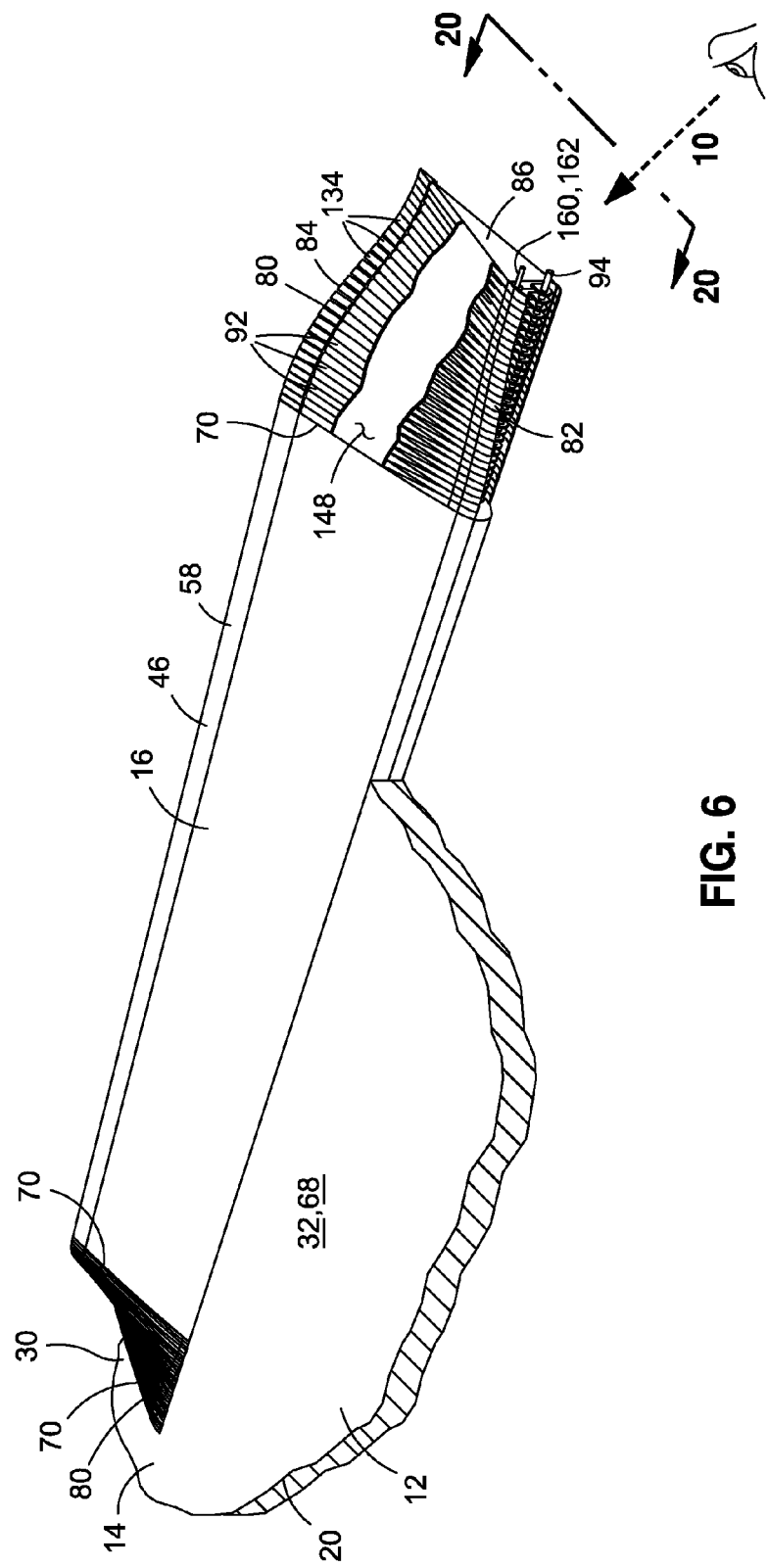
FIG. 6 is a forward perspective illustration of the aileron taken along line 6 of FIG. 5 and illustrating a plurality of ribs of the transition section.

Referring to FIGS. 5 and 6, shown is the aileron 46 deflected upward along a direction of deflection 60. The ribs 92 of the transition section 80 are illustrated as being arranged in stacked relation to one another. As was indicated above, each one of the ribs 92 is independently pivotable relative to one another such that the ribs 92 may be pivotable in incrementally varying amounts. The transition section 80 may include a skin panel 148 which may extend between the fixed structure 14 and the movable structure 16 and which may at least partially cover at least one of the ribs 92 and/or at least partially cover at least one of the tips 134 of the transition section 80.

The skin panel 148 is preferably formed of a substantially elastic or resiliently flexible material that may be deformable during pivoting of the ribs 92. In this regard, the skin panel 148 is preferably deformable during deflection of the movable structure 16 such as the aileron 46 illustrated in FIGS. 5 and 6. The skin panel 148 may return to its original configuration or shape when the movable structure 16 is moved from the deflected position 58 illustrated in FIG. 5 back to the undeflected position 56 illustrated in FIG. 3. In this regard, at least a portion of the skin panel 148 preferably comprises an elastomeric material which is configured to stretch in response to an increase in the distance between the side edges 64 of the aileron 46 (i.e., the movable structure 16) and the side edge 66 of the wing 20 (i.e., the fixed structure 14) during relative deflection of the structures 14, 16.

Figure 19:
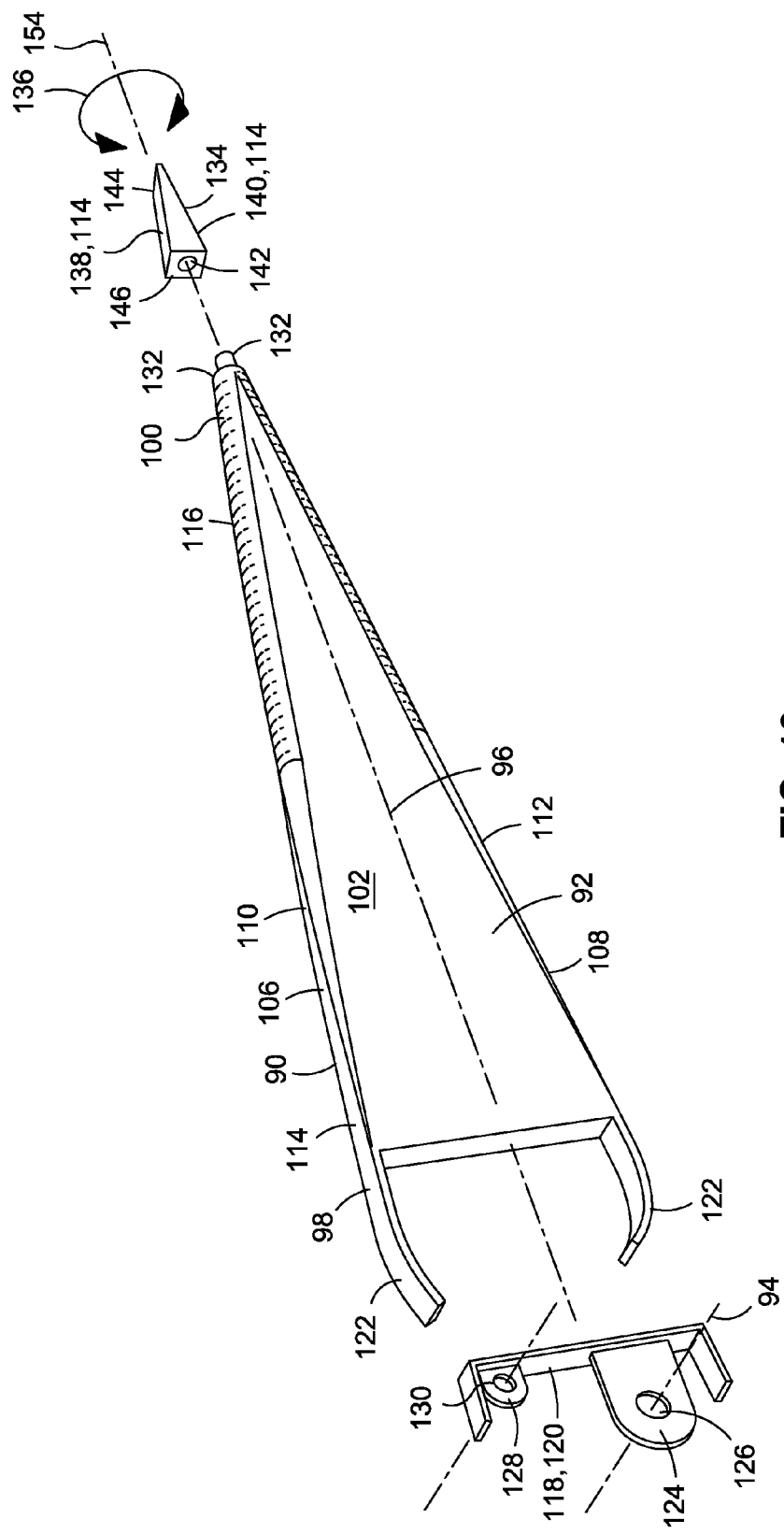
FIG. 19 is a perspective illustration of a rib assembly comprising the rib and the tip.

Referring briefly to FIGS. 13 and 19, in an embodiment, the transition section 80 may include a tip 134 which may be mounted at an aft end 100 of the rib 92. The tip 134 may be rotatable about a tip axis 154. The tip axis 154 may be oriented in substantially non-parallel relation to a rib pivot axis 94 extending along a length of the rib 92 between the rib forward end 98 and the rib aft end 100 as best seen in FIGS. 13 and 19. In this regard, the tip 134 may be mounted to the rib aft end 100 and may be rotatable about the tip axis 154. As will be described in greater detail below, the tip axis 154 may be oriented in substantially parallel relation to the rib longitudinal axis 96 extending between the rib forward end 98 and the rib aft end 100 as best seen in FIG. 19. For transition sections 80 comprised of a plurality of ribs 92, the tips 134 may be independently rotatable about the respective tip axes 154 such that each one of the tips 134 may rotate with the local angle of deformation of the skin panel 148 (FIG. 23). For example, FIG. 23 illustrates the relative rotation of the tips 134 about the respective tip pivot axes 154 such that the tips 134 are rotatable into substantial alignment with the skin panel 148 during relative deflection of the structures 14, 16 as described in greater detail below.

Figure 7:
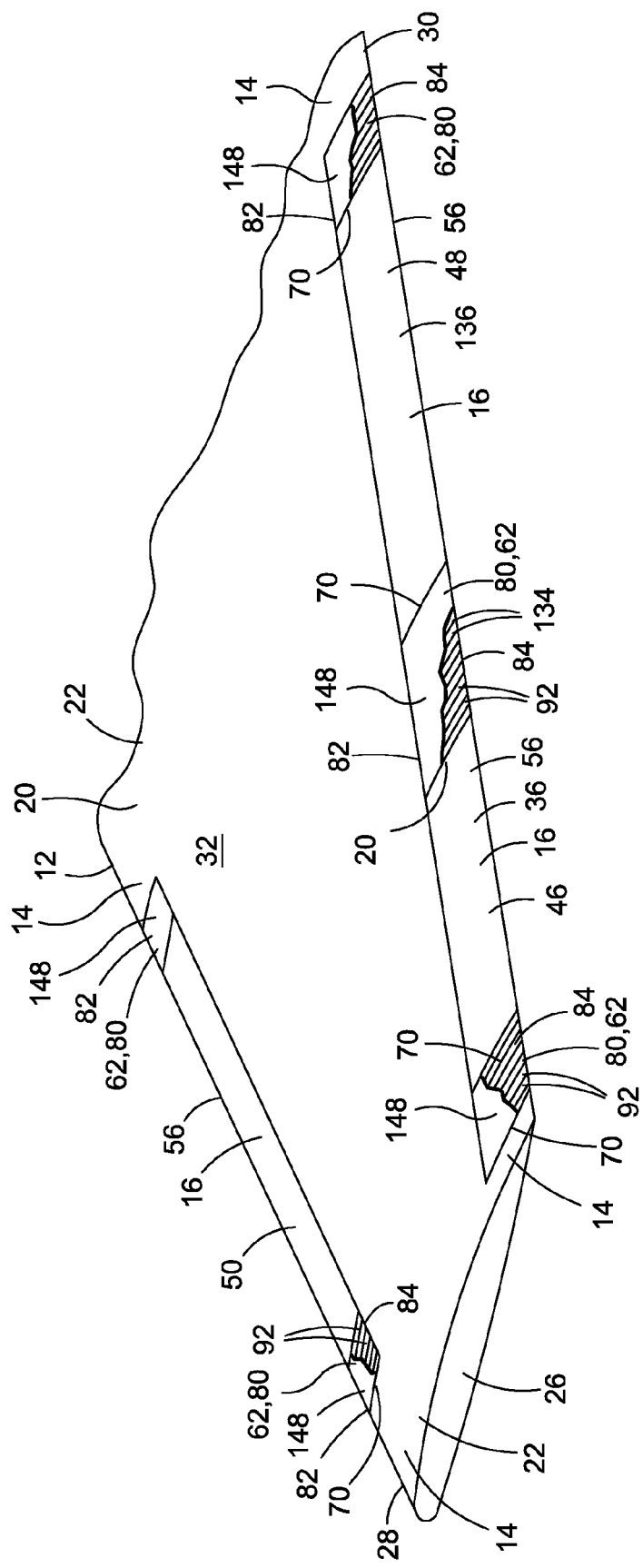
FIG. 7 is an aft perspective illustration of an embodiment of the wing having a leading edge flap installed at the wing leading edge and a trailing edge flap installed at the wing trailing edge in side-by-side relationship to the aileron.
Figure 8:
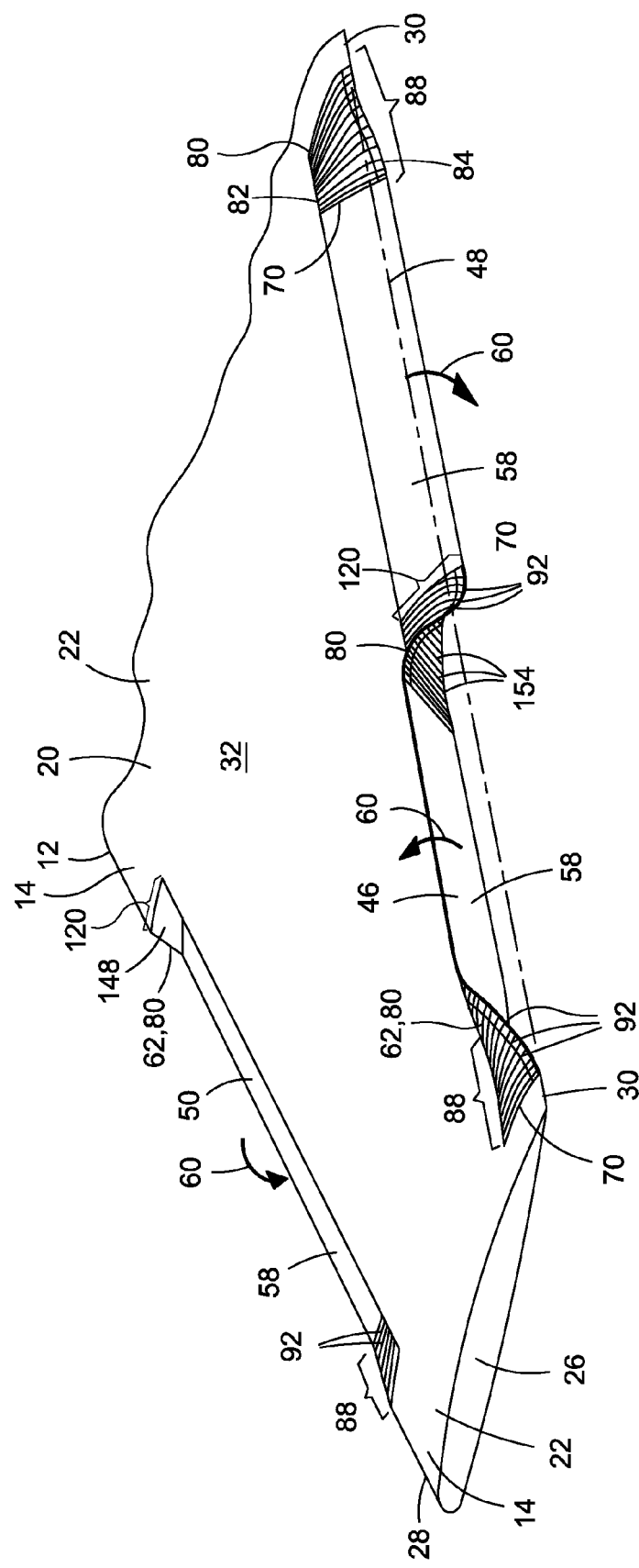
FIG. 8 is a perspective illustration of the wing of FIG. 7 illustrating the leading edge flap and trailing edge flap being downwardly deflected and the aileron being upwardly deflected and the continuous contour formed by the transition sections on opposite sides of the flaps and aileron.

Referring to FIGS. 7 and 8, shown is an embodiment of a wing 20 comprising multiple movable structures 16 mounted to the wing 20. For example, the wing leading edge 28 includes a leading edge flap 50 (i.e., slat) and includes transition sections 80 on each one of opposing side edges 64 (FIG. 4) of the leading edge flap 50. Each one of the transition sections 80 may comprise at least one rib 92 which may be independently pivotable relative to the structures 14, 16. For example, the ribs 92 may be independently pivotable relative to the leading edge flap 50 and relative to the wing 20 to which the leading edge flap 50 may be attached. FIG. 7 further illustrates an aileron 46 mounted to the wing trailing edge 30 in a manner described above with respect to FIGS. 4-6.

FIGS. 7-8 further illustrate a trailing edge flap 48 mounted on the wing trailing edge 30. The trailing edge flap 48 includes a pair of transition sections 80 mounted on opposing side edges 64 (FIG. 4) of the trailing edge flap 48. One of the transition sections 80 serves as the transition section 80 for the aileron 46 which is also shown as being mounted to the wing trailing edge 30. Each one of the transition sections 80 may include one or more ribs 92, each of which may be independently pivotable relative to one another to allow morphing of the transition sections 80 to facilitate a continuous contour 88 between the deflected movable structure 16 (i.e., ailerons 46 and trailing edge flaps 48) and the fixed structure 14 (e.g., the wing 20, fuselage 18, etc.). Each one of the transition sections 80 may be at least partially covered by a skin panel 148 as illustrated in FIG. 7 and which is preferably elastically deformable in a resilient manner.

For example, referring to FIG. 8, shown is the aileron 46 deflected upwardly and the trailing edge flap 48 deflected downwardly. The transition section 80 common to the aileron 46 and the trailing edge flap 48 may be sized and configured to accommodate the combined deflection angles of the aileron 46 and the trailing edge flap 48. In this regard, a transition section 80 common to a pair of movable structures 16 may include a greater quantity of ribs 92 relative to the quantity of ribs 92 in a transition section 80 between a movable structure 16 and a fixed structure 14. In addition, the transition section 80 common to a pair of movable structures 16 may have a greater width between the side edges 64 (FIG. 4) of a pair of movable structures 16 as compared to a reduced width transition section 80 between the side edge 66 of a fixed structure 14 and a movable structure 16. In this same regard, the transition section 80 may have a greater width for a proportionally greater chord length 120 (FIG. 8) of the transition section 80 as measured between the transition section 80 leading edge 82 and the transition section 80 trailing edge 84. The greater width transition section 80 for increased chord lengths 120 may accommodate relatively greater amounts of stretching of the skin panel 148 (FIG. 7) at the trailing edge 84 of the transition section 80. However, it is contemplated that the sizing of the transition section 80 may be based upon the deflection angle θ (FIG. 20), the chord length of the transition section or any one of a variety of other factors regardless of the type of structures 14, 16 between which the transition section 80 is installed.

By sizing the transition section 80 based upon the deflection angle θ (FIG. 20), mechanical strain may be minimized within the skin panel 148 of the transition section 80. In this regard, a relatively greater width of skin panel 148 for a given deflection angle θ may reduce the linear unit strain within the skin panel 148. The transition section 80 may optionally include a correspondingly larger quantity of ribs 92 for relatively larger amounts of deflection between structures 14, 16 as compared to transition sections 80 subjected to relatively smaller amounts of deflection between structures 14, 16. However, transition sections 80 subjected to relatively larger amounts of deflection may include a reduced quantity of ribs 92. In this regard, the ribs 92 may be arranged with increased spacing relative to one another.

As was mentioned above, the transition section 80 may be mounted to any type of movable structure 16 and subjected to any amounts of relative deflection and is not limited to mounting to a leading edge 82 or trailing edge 84 of an aerodynamic member 12. For example, in the context of an aircraft 10 (FIG. 1), the movable structure 16 may comprise a spoiler (not shown) such as may be mounted at any chordwise or spanwise location along a wing 20 surface. Likewise, the transition section 80 may be mounted to a movable structure 16 such as a rudder 40 coupled to a canted or substantially vertical stabilizer 38. The movable structure 16 may further comprise any one of a variety of other control devices 36 including, but not limited to, a trim tab or a canard (not shown). In addition, the transition section 80 may be mounted to movable structures 16 that may not be conventionally identified as directional control devices 36. For example, the movable structure 16 may comprise a landing gear door, a speed brake, a retractable wing fence, a retractable chine or strake and any other type of movable structure 16 that may be deflectable relative to a fixed structure 14 or relative to another movable structure 16.

Referring again to FIG. 9, as was briefly mentioned above, the movable structure 16 may comprise a control tab 186 such as may be mounted on a main rotor blade 182 of a rotorcraft 180. In this regard, the control tab 186 may be mounted along a trailing edge of a main rotor blade 182 for maintaining a continuous contour 88 (FIG. 11) with the fixed structure 14 of the main rotor blade 182. The transition section 80 may optionally be mounted at an inboard portion or root section of a conventional all-moving main rotor blade 182. For example, the transition section 80 may be mounted between the main rotor blade 182 and a fairing (not shown) of a rotor hub 184 of the main rotor blades 182 in a manner similar to that which is illustrated in FIG. 9. In this regard, the transition section 80 between a rotor hub 184 fairing and the main rotor blades 182 may preserve the aerodynamics of the main rotor blade 182 at the root during pitch deflections of the all-moving main rotor blade 182. It is further contemplated that the transition section 80 may be implemented on a tail rotor (not shown) of a rotorcraft 180 such as at the root of each one of the blades of the tail rotor.

Even further the transition section 80 may be implemented at the root of a propeller blade of a multi-bladed variable pitch propeller (not shown) of a propeller-driven aircraft. For example, the transition section 80 may be installed between the root of each one of the blades and a spinner (not shown) mounted to the rotating center of the variable pitch propeller. The transition section 80 may be installed on the propeller blade in a manner similar to that which is described above with regard to the movable structure 16 of a main rotor blade 182 and the fixed structure 14 of a main rotor hub 184 fairing of a rotorcraft 180. In this regard, the fixed and movable structures 14, 16 may comprise an object of any size, shape and configuration, without limitation.

Figure 10:
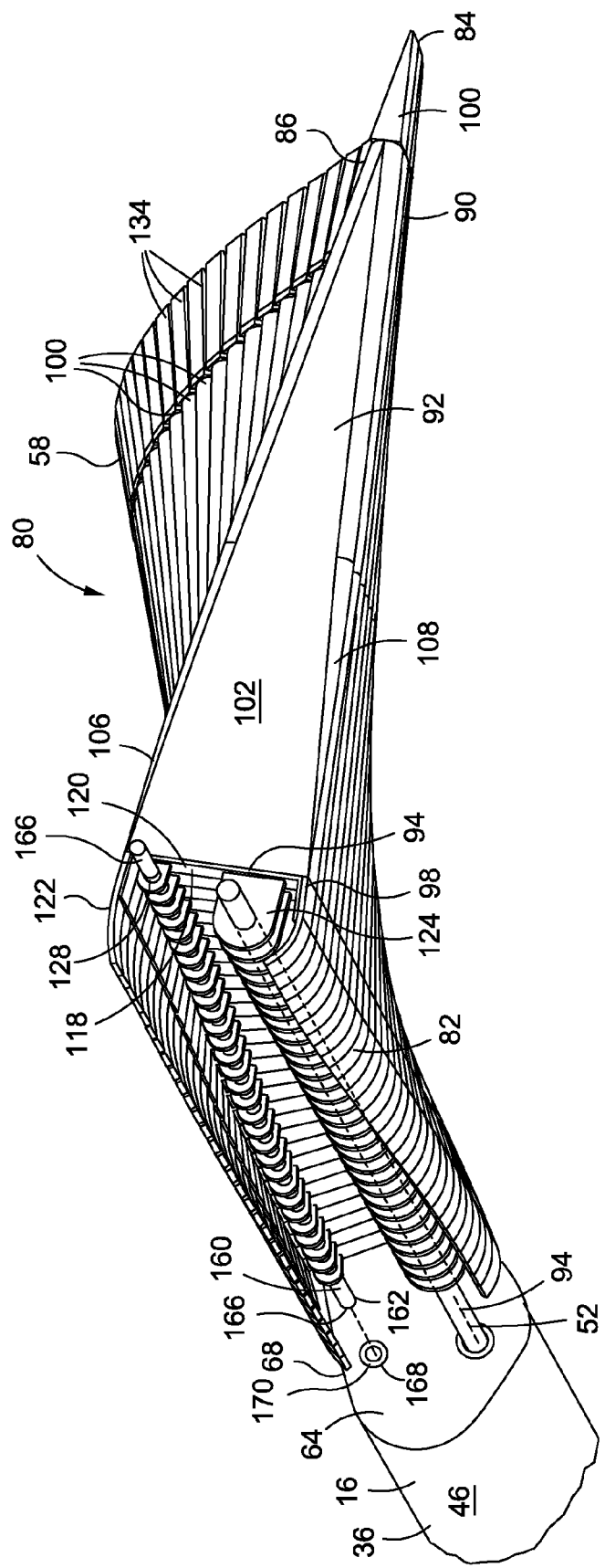
FIG. 10 is an enlarged perspective illustration of the transition section illustrating the plurality of ribs.

Referring to FIG. 10, shown is an enlarged perspective illustration of the transition section 80 wherein the movable structure 16 is shown in the deflected position 58. The skin panel 148, which is illustrated as covering the transition section 80 in FIGS. 7 and 8, has been omitted from FIG. 10 for clarity. As illustrated in FIG. 10, the transition section 80 may comprise a plurality of ribs 92 disposed in stacked arrangement and wherein the ribs 92 are independently pivotable relative to one another along a rib pivot axis 94. As can be seen, each one of the ribs 92 is preferably pivotable about the rib pivot axis 94 which may be coaxial or coincident with the structure pivot axis 52. The structure pivot axis 52 may be the axis about which the movable structure 16 is deflectable.

In an embodiment, the rib pivot axis 94 may be defined by a pivot rod which may extend through pivot tab holes 126 (FIG. 13) formed in pivot tabs 124 extending outwardly from each one of the ribs 92 at the rib forward end 98. Each one of the ribs 92 may optionally include a bearing or self-lubricating bushing or other friction reducing mechanism for rotation of the ribs 92 about the rib pivot axis 94. In this regard, each one of the ribs 92 may include a rib drive fitting 118 as best seen in FIG. 13. The rib drive fitting 118 may be integrally formed with the rib 92 or separately mounted to the rib 92 such as on a rib forward end 98 of the rib 92. As will be described in greater detail below, the rib drive fitting 118 may include the rib pivot tab 124 about which the rib 92 is pivotable.

Referring still to FIG. 10, the rib drive fitting 118 may include a rib torquing mechanism 160 to incrementally pivot the ribs 92 about the rib pivot axis 94. In FIG. 10, the rib torquing mechanism 160 is shown as a torque rod 162 coupled to each one of the ribs 92. For example, the torque rod 162 may extend through a torque tab hole 130 (FIG. 13) formed in a torque tab 128 that may be mounted to each one of the ribs 92. The rib torquing mechanism 160 may cause the ribs 92 to torque or pivot about the rib pivot axis 94. The rib torquing mechanism 160 facilitates pivoting of the ribs 92 in an incremental manner to effectuate a continuous contour 88 (FIG. 11) in the transition section 80 during deflection of a movable structure 16 relative to a fixed structure 14 or relative deflection of a pair of movable structures 16. As can be seen in FIG. 10, the torque rod 162 may also be engaged to the movable structure 16 at a rod-structure junction 170 located at the interface 70 (FIG. 11) between the transition section 80 and the movable structure 16. Likewise, the torque rod 162 may also be connected to the fixed structure 14 on an opposite side of the transition section 80 at a rod-structure joint 170.

Figure 11:
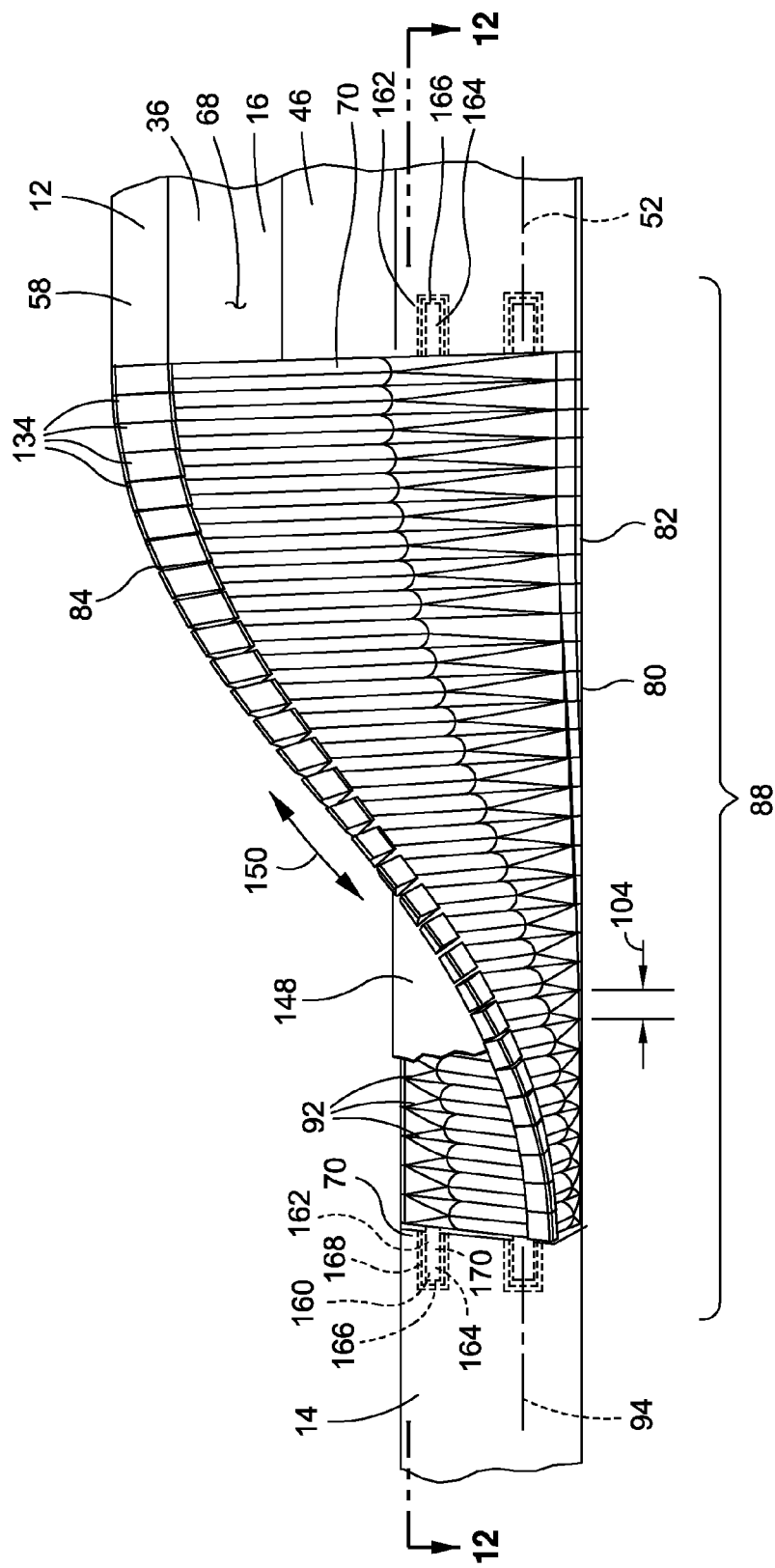
FIG. 11 is an illustration of the wing taken along line 11-11 of FIG. 5 and illustrating a plurality of tips mounted on each one of the ribs of the transition section.

Referring to FIG. 11, shown is a view looking forward at the transition section 80 mounted between the movable structure 16 (e.g., the aileron 46) and the fixed structure 14. As can be seen in FIG. 11, the transition section 80 comprises the plurality of ribs 92 arranged in stacked arrangement at a desired rib spacing 104. Each one of the ribs 92 may include a tip 134 which may be rotatably coupled to the rib aft end 100 (FIG. 13) of each one of the ribs 92 and which may be rotatable in correspondence with the deformation of the skin panel 148 partially as illustrated in FIG. 11. More specifically, the deflection of the movable structure 16 relative to the fixed structure 14 may cause the ribs 92 to pivot in incrementally varying amounts to form a continuous contour 88 in the transition section 80 between the movable structure 16 and the fixed structure 14. Each one of the tips 134 may rotate about its tip axis 154 (FIG. 13) such that the tip upper edge 138 and tip lower edge 140 (FIG. 13) of each tip 134 are rotated to maintain substantial alignment of the tips 134 with the skin panel 148.

The deflection of the movable structure 16 and incremental pivoting of the ribs 92 results in the deformation and stretching of the skin panel 148 in the direction indicated by element numeral 150 in FIG. 11. As was earlier indicated, the skin panel 148 is preferably formed of a material that is resiliently stretchable to minimize strain buildup within the skin panel 148. In this regard, the skin panel 148 material may be selected based upon the maximum strain at the location of maximum stretching at the trailing edge 84 (FIG. 11) of the transition section 80.

The rib torquing mechanism 160 may be coupled to each one of the ribs 92 to facilitate pivoting of the ribs 92 in incrementally increasing or decreasing angles. For example, based upon the mechanical properties of the torque rod 162, the ribs 92 may optionally be pivoted at a geometrically increasing rate as shown in FIG. 11 along a direction from the fixed structure 14 on the left-hand side of the transition section 80 toward a midpoint of the transition section 80. The ribs 92 may optionally be pivoted at a geometrically decreasing rate along a direction from the midpoint of the transition section 80 toward the movable structure 16 on the right-hand side of the transition section 80. In this manner, the rib torquing mechanism 160 facilitates a substantially tangent relationship between the structure surfaces 68 of the fixed structure 14 and the skin panel 148 of the transition section 80 at the interface 70 between the fixed structure 14 and the transition section 80 and at the interface 70 between the movable structure 16 and the transition section 80. In this manner, the rib torquing mechanism 160 facilitates the formation of a general S-shape in the transition section 80.

Figure 12:
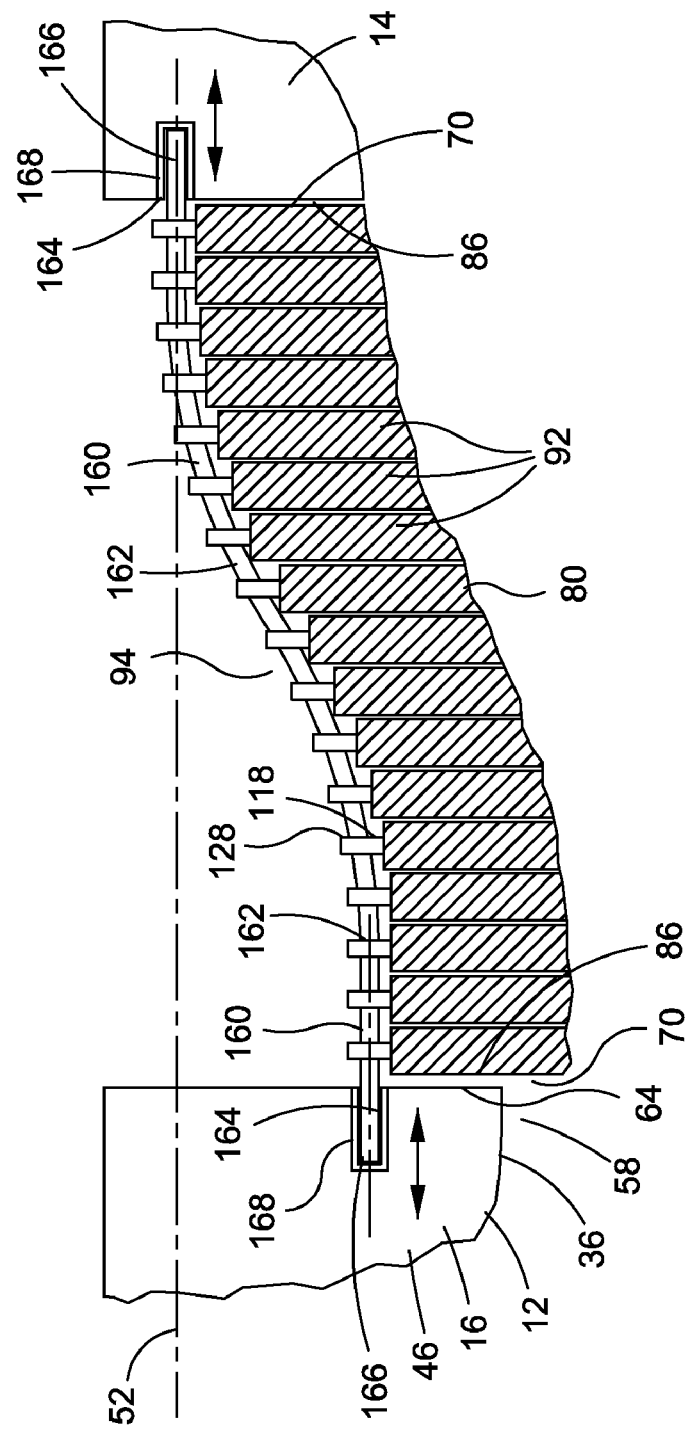
FIG. 12 is a top view illustration of the transition section and illustrating a rib torquing mechanism extending between the structures.

Referring to FIG. 12, shown is a top cross-sectional illustration of the transition section 80 illustrating an embodiment of the rib torquing mechanism 160 coupled to the movable structure 16 and to the fixed structure 14. Alternatively, FIG. 12 may be representative of an embodiment of the rib torquing mechanism 160 coupled between a pair of movable structures 16. As was indicated above, the rib torquing mechanism 160 may comprise the torque rod 162 which may extend between the structures and which may be coupled to at least one of the ribs 92. As illustrated in FIG. 12, the torque rod 162 may be coupled to the rib forward ends 98 of each one of the ribs 92 such as by means of the torque tab 128 extending outwardly from the rib forward end 98 (FIG. 13).

Referring briefly to FIG. 13, shown is a side view of the rib 92 illustrating the torque tab 128 extending outwardly from the rib forward end 98. The torque tab 128 may comprise a portion of the rib drive fitting 118 which may be integrated with or mounted to the rib forward end 98. FIG. 13 also illustrates the rib pivot tab 124 which may be extended outwardly from the rib forward end 98 and which may comprise a portion of the rib drive fitting 118. Each one of the rib torque tabs 128 may includes a torque tab hole 130 or other mechanism for engaging the torque rod 162.

As shown in FIG. 12, the torque rod 162 may engage the movable structure 16 on one end of the transition section 80 and the fixed structure 14 on an opposite end of the transition section 80. Each end of the torque rod 162 may terminate at a rod terminus 166 which may be engageable within a rod fitting 168 or other mechanism for engaging the rod terminus 166. The rod fitting 168 may optionally be integrated into or mounted to the fixed structure 14 and/or movable structure 16. The torque rod 162 may optionally be aligned with the rib pivot axis 94 of the transition section 80. However, the torque rod 162 may be oriented in any direction and is not limited to alignment with the rib pivot axis 94. Even further, the torque rod 162 may be mounted at any location on the rib 92 and is not limited to being mounted at a rib forward end 98 (FIG. 13) of each one of the ribs 92. For example, the torque rod 162 may extend through torque tab holes 130 formed at any location on the rib 92 such as at a mid-section of the rib 92 or toward a rib aft end 100 of each one of the ribs 92. However, in an embodiment, mounting of the torque rod 162 at a rib forward end 98 of each one of the ribs 92 may facilitate access to the torque rod 162 to simplify installation, assembly and maintenance.

Referring still to FIG. 12, the torque rod 162 is shown exhibiting a generally twisted shape relative to the rib pivot axis 94 during relative deflection of the structures 14, 16. In this regard, each one of the rod terminuses 166 may be engaged to the rod fitting 168 such that the torque rod 162 is restricted against lateral movement relative to the respective structures 14, 16 at the rod-structure junctions 170 (FIG. 11). By configuring the torque rod 162 to be laterally non-movable relative to the respective structures 14, 16 at the rod-structure junctions 170, the ribs 92 are caused to pivot in incrementally increasing and decreasing angles between the structures 14, 16. Furthermore, the skin panel 148 (FIG. 11) of the transition section 80 is maintained in substantially tangent relation to the structure surfaces 68 (i.e., skins) of the fixed and movable structure 14, 16 at the interface 70 between the transition section 80 and the structures 14, 16. The substantially tangent relation between the skin panel 148 of the transition section 80 and the structure surfaces 68 of the structures 14, 16 results in the generally continuous contour 88 (FIG. 11) across the transition section 80 between the structures 14, 16 as best seen in FIG. 11.

Referring to FIG. 12, the torque rod 162 may include an opposing pair of rod terminuses 166 that are preferably axially slidable relative to the structures 14, 16 to accommodate changes in distance between the structures 14, 16 during relative deflection of the structures 14, 16. More specifically, the torque rod 162 is preferably axially slidable relative to at least one of the side edges 66, 64 of the respective structures 14, 16 in order to accommodate changes in distance between the side edges 66, 64 of the structures 14, 16 during relative deflection of the structures 14, 16. In this regard, the rod terminus 166 may be slidably engaged with a relatively close tolerance fit within the rod fitting 168 of the structures 14, 16. As may be appreciated, the torque rod 162 may be axially movably coupled to the structures 14, 16 in any one of a variety of different manners and is not limited to the rod fitting 168 arrangement illustrated in the Figures.

It should also be noted that although the Figures illustrate the rib torquing mechanism 160 as a torque rod 162 extending between the structures 14, 16 and coupled to the ribs 92, the rib torquing mechanism 160 may comprise any one of a variety of different mechanisms for effectuating incremental pivoting of the ribs 92 relative to one another. Further in this regard, the rib torquing mechanism 160 is not to be construed as being limited to effectuating incremental pivoting of the ribs 92 to form the above-described S-shape of the transition section 80 as illustrated in FIGS. 11 and 21-23. In this regard, the rib torquing mechanism 160 may be configured to pivot the ribs 92 in any desired manner. In an embodiment, the rib torquing mechanism 160 may comprise one or more actuators which may be coupled to one or more ribs 92 to effectuate the rib torquing in a manner to generate the desired continuous contour 88 (FIG. 11) between the structures 14, 16.

For example, the rib torquing mechanism 160 may comprise one or more mechanical actuators such as may be mounted between the forward ends of the ribs 92 and the member to which the movable structure 16 is mounted. Furthermore, the rib torquing mechanism 160 may be configured as a component of the movable structure 16 and/or of the fixed structure 14 wherein the rib torquing mechanism 160 is engaged to one or more side edges 86 (FIG. 12) of the transition section 80 in order to facilitate the formation of the continuous contour 88 (FIG. 11) between the movable structure 16 and the fixed structure 14 during relative deflection of the structures 14, 16. It is further contemplated that the rib torquing mechanism 160 may be coupled to a single one of the ribs 92 or to a stack of the ribs 92 of the transition section 80.

Referring to FIG. 13, shown is a side view of the rib assembly 90 comprising the rib 92 and including at least one tip 134. As was earlier indicated, the rib 92 may optionally include a rib drive fitting 118 which may be integrated with or coupled to the rib 92 at any location thereof such as along the rib forward end 98. The rib drive fitting 118 may include a pivot tab 124 about which the rib 92 may be pivoted and a torque tab 128 to which the rib torquing mechanism 160 may be coupled. The rib drive fitting 118 and/or rib 92 may further include flange extensions 122 which may extend outwardly from the rib forward end 98 in order to preserve the aerodynamics of airflow between the leading edge 82 of the transition section 80 and the aft end of a member such as a wing 20 to which the transition section 80 may be mounted.

Figure 25:
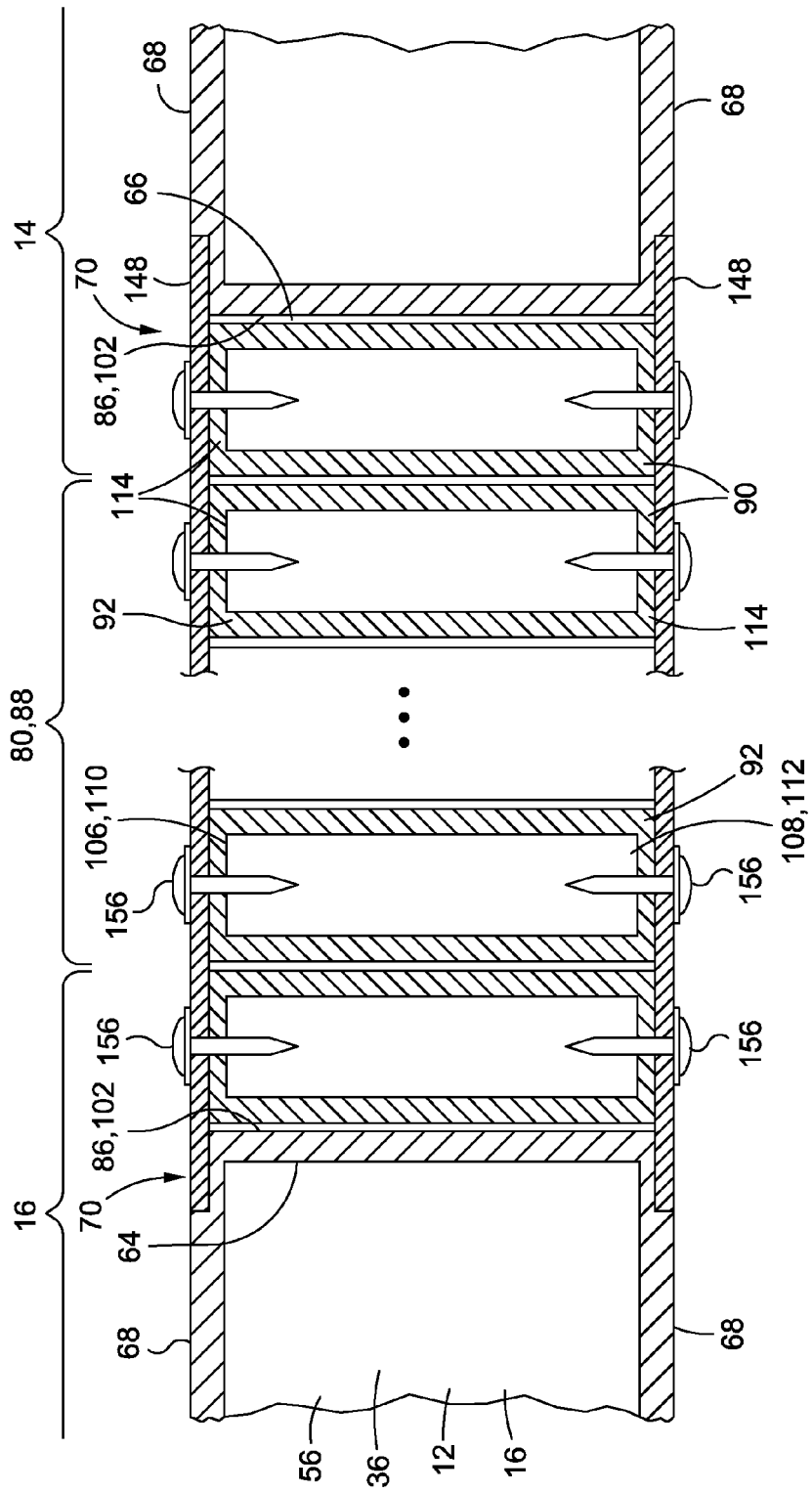
FIG. 25 is a cross section of the transition section illustrating an embodiment for attaching the skin panels to the ribs.

As shown in FIG. 13, the rib 92 may include rib upper and lower edges 106, 108. The rib upper edge 106 and rib lower edge 108 may extend from the rib forward end 98 to the rib aft end 100. The rib upper and lower edges 106, 108 may be configured to facilitate contact between the skin panel 148 (FIG. 11) and the rib 92. The rib upper and lower edges 106, 108 may also be configured to facilitate attachment of the skin panel 148 to the rib 92. For example, in a non-limiting embodiment, FIG. 25 illustrates mechanical fasteners 156 being extended through the skin panel 148 into the rib upper and lower flanges 110, 112. However, the skin panel 148 may be disposed against the rib 92 and may optionally be attached to the rib 92 in any one of a variety of manners such as by adhesively bonding or mechanical attachment as described in greater detail below.

Referring to FIG. 14, shown is a sectional view of the rib 92 taken along line 14-14 of FIG. 13 and illustrating a generally rectangular cross-sectional shape of the rib 92. The rib 92 may optionally have a hollow configuration bounded by rib lateral sides 102 and the rib upper and lower edges 106, 108. The rib upper and lower edges 106, 108 may have a generally planar shape 114 such as at the rib forward end 98 (FIG. 13). Although shown having a generally hollow configuration, the rib 92 may be provided in any cross-sectional shape. For example, the rib 92 may have a C-shaped cross section, an L-shaped cross section, an I-shaped cross section or any one of a variety of alternative cross-sectional shapes. FIG. 15 illustrates a cross section of the rib 92 taken along a mid-location of the rib 92 and illustrating the rib upper and lower edges 106, 108 having a generally rounded shape 116 with shortened lateral sides 102 of reduced height. FIG. 16 illustrates a cross section of the rib 92 taken at the rib aft end 100 and illustrating a substantially oval or rounded shape 116 of the rib upper and lower edges 106, 108.

Referring to FIG. 17, shown is a cross-sectional illustration of the tip 134 having a generally planar shape 114 along the tip upper and lower edges 138, 140. As described in greater detail below, the planar shape 114 of the tip upper and lower edges 138, 140 may facilitate engagement of the skin panel 148 (FIG. 11) to the tip 134 such that the deflection of the movable structure 16 and corresponding pivoting of the ribs 92 and deformation of the skin panel 148 causes the tips 134 to rotate to maintain alignment with the skin panel 148 at the trailing edge 84 (FIG. 11) of the transition section 80. Advantageously, the rotatability of the each one of the tips 134 relative to the rib 92 facilitates a substantially smooth or uniform contour between the structures 14, 16 at the trailing edge 84 of the transition section 80. Furthermore, the rotation of the tips 134 minimizes the buildup of mechanical strain in the skin panel 148 which may reduce forces otherwise required to actuate the movable structure 16.

Referring to FIGS. 18 and 19, shown is a cross-sectional illustration of the junction between the tip 134 and the rib aft end 100. In the embodiment illustrated, the tip includes a tip forward end 142 and a tip aft end 144. The rib 92 may include a stud 132 extending axially outwardly from the rib aft end 100 for receipt into or engagement with a complementary bore 146 formed in the tip forward end 142. As was earlier indicated, the tip 134 is rotatable about a tip axis 154 along a rotational direction 136 (FIG. 19) such that the axis of the stud 132 and bore 146 may be coincident with the tip axis 154. Although the junction between the tip 134 and rib 92 is illustrated as comprising the stud 132 and bore 146, any arrangement for rotatably engaging the tip 134 to the rib 92 may be implemented. For example, the stud 132 may be formed on the tip forward end 142 and the bore 146 may be formed on the rib aft end 100 for receiving the stud 132. Furthermore, it is contemplated that the stud 132 and bore 146 may be altogether omitted and the tip 134 may be maintained in relation to the rib 92 by means of the skin panel 148 (FIG. 11) extending over the tip 134 such that the tip 134 is captured between the skin panel 148 and the rib 92.

Figure 21:
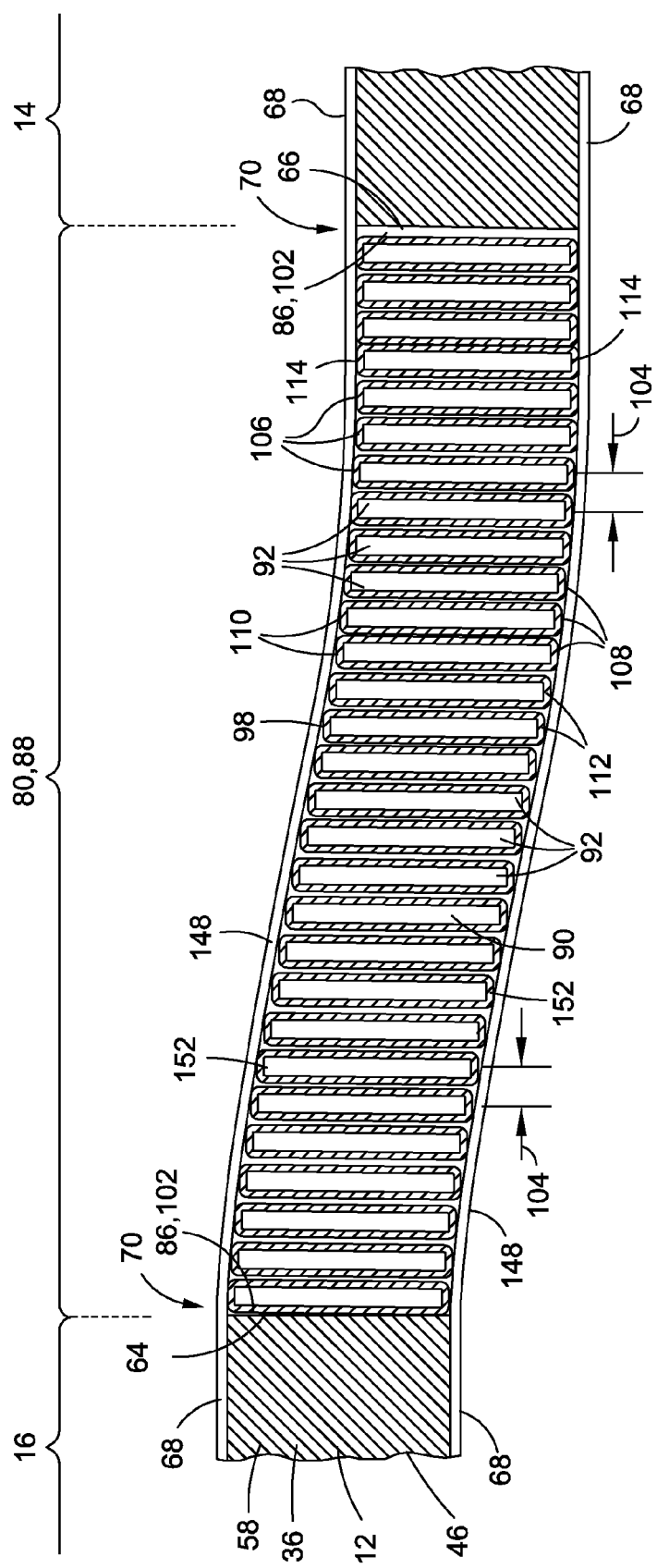
FIG. 21 is a cross section of the transition section taken along line 21-21 of FIG. 20 and illustrating a skin panel of the transition section intersecting the structures (i.e., aileron and wing) in substantially tangent relation to the structure surfaces.
Figure 22:
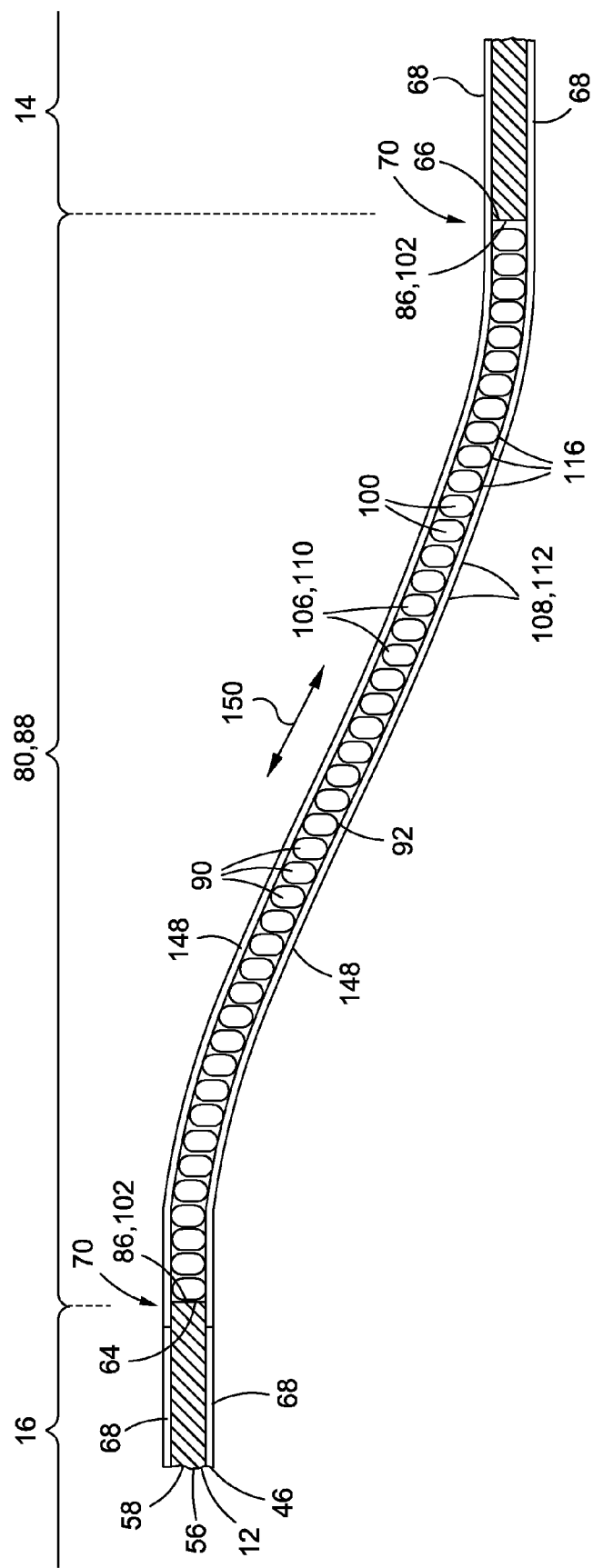
FIG. 22 is a cross section of the transition section taken along line 22-22 of FIG. 20 and illustrating the skin panels of the transition section in contacting relation with the rounded shape of each one of the rib upper and lower edges.

Referring to FIG. 19, shown is a perspective illustration of the rib 92 and illustrating an embodiment of the shape of the rib upper edge 106 transitioning from a planar shape 114 at the rib forward end 98 to the generally rounded shape 116 at the rib aft end 100. As described in greater detail below, the configuration of the rib upper edge 106 and/or rib lower edge 108 from the planar shape 114 to the rounded shape 116 accommodates the increase in angle at which the skin panel 148 (FIG. 11) is rotated or is deformed when the skin panel 148 is viewed along a direction from the rib forward end 98 to the rib aft end 100. For example, as shown in FIGS. 21-22, when viewing the skin panel 148 along a direction generally parallel to the rib longitudinal axis 96 (FIG. 19—from the rib forward end 98 toward the rib aft end 100), the angle of the skin panel 148 during deflection of the movable structure 16 relative to the fixed structure 14 is greater at the rib aft end 100 as shown in FIG. 22 as compared to the angle of the skin panel 148 at the rib forward end 98 as shown in FIG. 21.

Therefore, the rounded portion of the rib upper and lower edges 106, 108 at the rib aft end 100 may facilitate contact between the rib 92 and the skin panel 148. However, the rib upper and lower edges 106, 108 may be formed in any size, shape and configuration and are not limited to that which is illustrated in the Figures. For example, the entire length of rib upper and lower edges 106, 108 may have a generally rounded shape 116. Likewise, the rib 92 may be formed with a planar shape 114 along the rib upper edge 106 and rib lower edge 108 along the entire length thereof.

Figure 20:
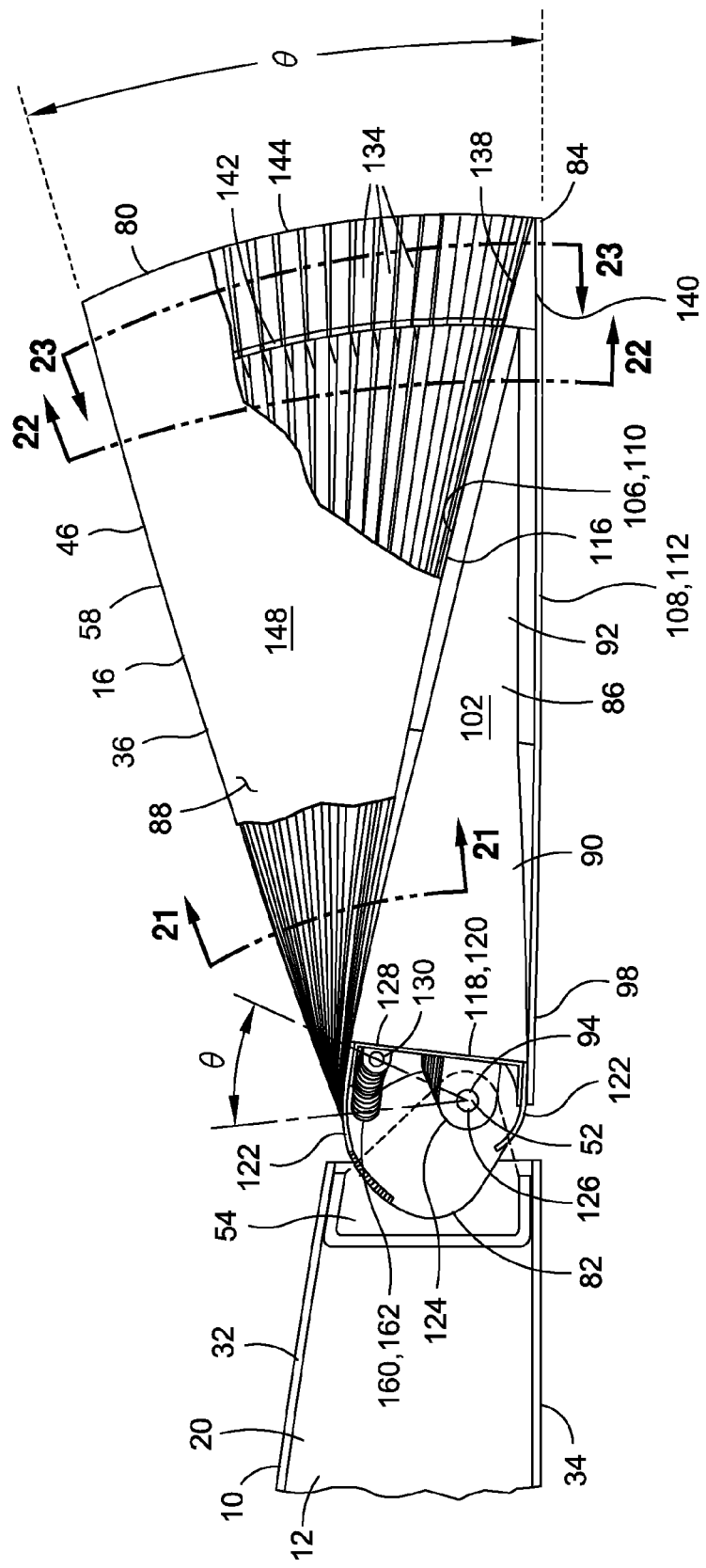
FIG. 20 is a side view illustration of the transition section taken along line 20-20 of FIG. 6 and illustrating incrementally increasing angles about which the ribs are pivoted.

Referring to FIG. 20, shown is a side view of the transition section 80 mounted to the movable structure 16 in a deflected position 58 and illustrating an aerodynamic member 12 such as a wing 20 to which the movable structure 16 (i.e., aileron 46) may be mounted. In the embodiment illustrated in FIG. 20, the movable structure 16 may be mounted to the aerodynamic member 12 by any suitable mechanism such as by a hinge fitting or hinge member 54. The movable structure 16 may be deflectable about the structure pivot axis 52 defined by the hinge member 54. As was earlier indicated, the transition section 80 may be pivotable about the rib pivot axis 94 which may be coaxial with or coincident with the structure pivot axis 52.

FIG. 20 further illustrates a series of rib torque tabs 128 extending outwardly from the rib forward end 98 of each one of the ribs 92 and the progressively increasing deflection angle θ of each one of the ribs 92 along a direction from the fixed structure 14 to the movable structure 16. As can be seen in FIG. 20, the torque rod 162 extends through the torque tab holes 130. The torque rod 162 may be connected to the movable structure 16 and the fixed structure 14 at rod fittings 168 as shown in the embodiment illustrated in FIG. 12 although any suitable mechanism may be used for engaging the torque rod 162. FIG. 20 further illustrates the skin panel 148 at least partially covering the ribs 92 and/or the tips 134 and illustrating the relative rotation of the tips 134 along the trailing edge 84 of the transition section 80.

Referring to FIG. 21, shown is a cross-sectional illustration of the transition section 80 and the interface 70 thereof with the movable structure 16 and the fixed structure 14 on opposing sides of the transition section 80. As was indicated above, each one of the rib upper and lower edges 106, 108 may have a generally planar shape 114 at the rib forward end 98 (FIG. 20) to facilitate attachment of the skin panel 148. As shown in FIG. 21, the ribs 92 of the transition section 80 may be pivoted such that the skin panel 148 is substantially tangent relation to the structure surfaces 68 of the movable structure 16 and fixed structure 14. As was earlier indicated, such tangent relation may be effectuated by the rib torquing mechanism 160 incrementally pivoting the ribs 92 in increasing and decreasing angles to form the S-shaped curve in the trailing edge 84 (FIG. 20) of the transition section 80 as described above. However, the rib torquing mechanism 160 may be configured to pivot the ribs 92 in any manner and is not limited to providing a substantially tangent relation at the junction of the skin panel 148 with the structure surfaces 68.

Referring to FIG. 22, shown is a cross-sectional illustration of the transition section 80 and illustrating the rounded shapes 116 of the rib upper and lower edges 106, 108 of each one of the ribs 92. As was earlier indicated, due to the relatively greater angle at which the skin panel 148 is deformed or bent at the rib aft end 100 relative to the angle at which the skin panel 148 is deformed or bent at the rib forward end 98, the rib upper and lower edges 106, 108 may be provided with a rounded shape 116 at the rib aft end 100 (FIG. 19) to facilitate contact of the skin panel 148 at a tangent of the rib forward and aft ends 98, 100. In this manner, the rounded shape 116 may facilitate a smooth contour or shape of the skin panel 148 and may avoid a generally stepped arrangement of the skin panel 148 if the ribs 92 were provided with a planar shape 114 at the rib aft end 100.

Referring to FIG. 23, shown is a cross-sectional illustration of the transition section 80 taken along line 23-23 of FIG. 20 and illustrating the relatively increasing amounts of rotation of each one of the tips 134 along a direction from the fixed structure 14 toward a midpoint of the trailing edge 84 (FIG. 20) of the transition section 80. As can be seen in FIG. 23, the tip 134 of the rib 92 that is located adjacent to the fixed structure 14 on the left-hand side of the transition section 80 may have a relatively smaller degree of angular rotation as compared to the progressively increasing amounts of rotation of the tips 134 located adjacent the midpoint of the transition section 80.

However, at the approximate midpoint or inflection point in the contour of the trailing edge 84 (FIG. 20) of the transition section 80, the amount of angular rotation of the tips 134 may gradually decrease along a direction toward the movable structure 16. As can be seen in FIG. 23, the tips 134 facilitate a relatively smooth outer surface of the skin panel 148 at the trailing edge 84 of the transition section 80 on the exterior mold line contour. Advantageously, the rotating tips 134 also facilitate stretching of the skin panel 148 along the direction indicated by reference numeral 150 in FIGS. 22 and 23. In this manner, the rotating tips 134 reduce the forces required to actuate the movable structure 16 as a result of the reduced mechanical strain in the skin panel 148 at the trailing edge 84 where the greatest amount of stretching of the skin panel 148 may occur.

Referring still to FIG. 23, the skin panel 148 may be engaged to the transition section 80 ribs 92 by any suitable means. For example, the ribs 92 may be adhesively bonded to the skin panel 148 such as along the rib upper and lower edges 106, 108. Likewise, the skin panel 148 may be bonded to the tips 134 along the tip upper and lower edges 138, 140. However, as was earlier indicated, the tips 134 may be mounted in a manner wherein the tips 134 are captured by the skin panel 148 and are held in place against the rib 92 by means of the elastic force of the skin panel 148 against the tip 134. Alternatively, any portion of the tip upper and lower edges 138, 140 may include adhesive 152 and/or mechanical fasteners 156 (FIG. 25) in order to fasten at least a portion of the skin panel 148 to the tip 134. Likewise, the skin panel 148 may be engaged to one or more of the ribs 92 of the transition section 80 by any suitable means including mechanical fastening 156 and/or bonding.

Shown in FIG. 24 is an illustration of a portion of the transition section 80 in an undeflected state 56 (FIG. 3) to illustrate the non-rotation of the tips 134 relative to the ribs 92. In this regard, FIG. 24 illustrates the rotation of the tips 134 relative to the ribs 92 that is illustrated in FIG. 23. FIG. 24 further illustrates an embodiment of the junction of the skin panel 148 to the structure surface 68 of the fixed structure 14. A similar arrangement may be employed for engaging the skin panel 148 to the structure surface 68 of the movable structure 16.

FIG. 25 illustrates mechanical fasteners 156 extended through the skin panel 148 and engaging upper and lower flanges 110, 112 of the ribs 92. As illustrated in FIG. 25, the mechanical fasteners 156 extend through the upper and lower flanges 110, 112. The upper and lower flanges 110, 112 are shown having a generally planar shape 114 such as may be formed on a rib forward end 98 (FIG. 20) of the ribs 92 where relative displacement between adjacent one of the ribs 92 is at a minimum. In contrast, at the aft end 100 of the ribs 92, the skin panel 148 may contact the ribs 92 at the tangent point of the ribs 92 as best seen in FIG. 22 as described above. In this regard, the skin panel 148 may be installed without the use of mechanical fasteners 156 and/or without the use of adhesive 152. The rib upper and lower edges 106, 108 may allow the skin panel 148 to freely pivot about the rounded shape 116 during relative deflection of the structures 14, 16.

Referring to FIG. 25, shown are the ribs 92 of the transition section 80 being disposed in relatively close relationship to one another. However, the ribs 92 may be mounted in any suitable spacing including constant spacing and/or variable spacing along the transition section 80. Even further, although the transition section 80 is illustrated as including ribs 92 that are disposed in relatively close proximity to the side edges 64, 66 of the structures 14, 16, the transition section 80 may be configured such that the ribs 92 nearest the side edges 64, 66 of the structures 14, 16 are disposed in spaced relation to the structures 14, 16.

Figure 26:
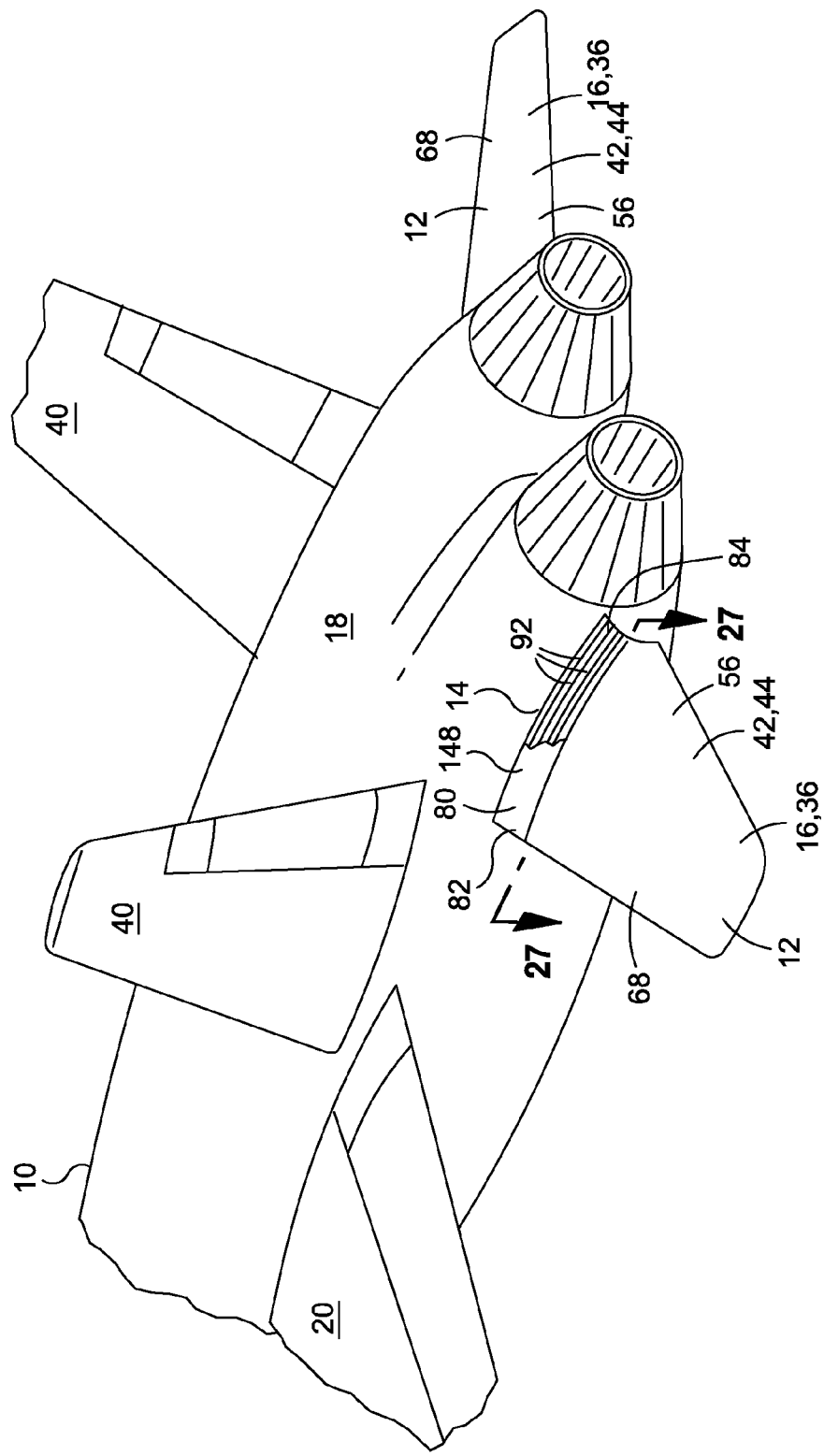
FIG. 26 is an enlarged perspective illustration of an aft end of the aircraft of FIG. 1 and illustrating an embodiment of the transition section mounted between the fixed structure of the fuselage and the movable structure of the horizontal stabilizer.

Referring briefly to FIG. 26, shown is an aft perspective illustration of the aircraft 10 of FIG. 1 and illustrating the transition section 80 installed between the fixed structure 14 of the fuselage 18 and the movable structure 16 of the all-moving horizontal stabilizer 42/elevator 44 (i.e., stabiliator). As was indicated above, the transition section 80 may be configured to morph in a manner providing a continuous contour 88 (FIG. 5) between the fixed structure 14 of the fuselage 18 and the movable structure 16 of the stabilizer 42. In this regard, the transition section 80 illustrated in FIG. 26 provides continuity between the fuselage 18 and the horizontal stabilizer 42 from the leading edge 82 to the trailing edge 84 thereof using a plurality of ribs 92.

Referring briefly to FIG. 27, shown is a top view of the fixed structure 14 of the fuselage 18 having the transition section 80 (FIG. 26) mounted between the fixed structure 14 of the fuselage 18 and the all-moving horizontal stabilizer 42. As can be seen, the transition section 80 may comprise one or more ribs 92. In the embodiment illustrated in FIG. 27, the ribs 92 may have a varying profile to accommodate a sweep angle of the leading edge 82 (FIG. 26) of the horizontal stabilizer 42. Likewise, the profile of the ribs 92 may accommodate a cutout in the trailing edge 84 of the horizontal stabilizer 42 adjacent the engines for spacing the horizontal stabilizer 42 away form the extreme heat generated by the engine exhaust. In this regard, the ribs 92 may be formed in a variable profile such that the transition section 80 is complementary to the structures 14, 16 between which the transition section 80 is installed.

Referring to FIG. 28, shown is a perspective illustration of the transition section 80 in a deformed state due to the deflection of the all-moving horizontal stabilizer 42 wherein the leading edge 82 of the horizontal stabilizer 42 is shown deflected upwardly and the trailing edge 84 is deflected downwardly. As shown in FIG. 28, the ribs 92 of the transition section 80 may optionally be of one-piece construction from the leading edge 82 to the trailing edge 84 of the transition section 80. However, the ribs 92 may be formed as an assembly of components or in other suitable configurations.

The transition section 80 illustrated in FIGS. 26-29 may function in a manner similar to that which was described above for the transition section 80 shown in FIGS. 1-25. In this regard, the transition section 80 ribs 92 may incrementally pivot about a common rib pivot axis 94 which may extend through an approximate longitudinal midpoint of the ribs 92. However, the rib pivot axis 94 for the transition section 80 illustrated in FIG. 28 may be positioned at any location of the rib 92 and is not limited to an approximate longitudinal midpoint location as illustrated in FIGS. 26-29.

As can be seen in FIG. 28, the transition section 80 may include one or more of the rib torquing mechanisms 160 to incrementally pivot the ribs 92. For example, the rib torquing mechanism 160 may comprise one or more torque rods 162 arranged similar to that which was described above with regard to FIGS. 1-25 and wherein the torque rods 162 may extend through drive fittings 118 and/or torque tab holes 130. As shown in FIG. 28, the torque tab holes 130 may be formed in each one of the ribs 92. The rod terminuses 166 (FIG. 12) of each one of the torque rods 162 may be attached to the fixed structure 14 of the fuselage 18 and to the movable structure 16 of the horizontal stabilizer 42 such that deflection of the horizontal stabilizer 42 results in twisting of the torque rods 162 relative to the structure pivot axis 52. The structure pivot axis 52 about which the horizontal stabilizer 42 deflects may be coaxial with or coincident with the rib pivot axis 94 of the ribs 92 of the transition section 80. The ribs 92 may optionally include a reinforcement (not shown) around the torque tab holes 130 to react to the torque forces imposed by the torque rod 162 into the ribs 92 during relative deflection of the horizontal stabilizer 42.

Figure 32:
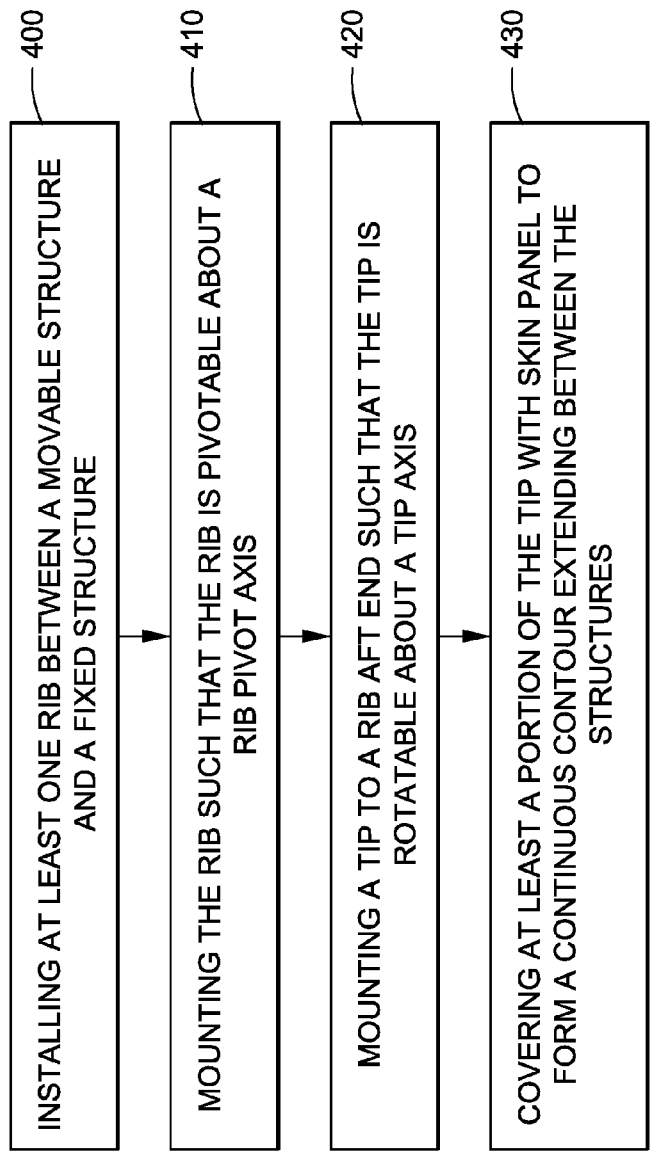
FIG. 32 is an illustration of a flow chart of a methodology comprising one or more operations for forming a movable structure.

Referring to FIG. 29, shown is a side view of the transition section 80 in the deflected shape and illustrating the upward direction of deflection 60 for the leading edge 82 and the downward direction of deflection 60 for the trailing edge 84 of the horizontal stabilizer 42. As can be seen in FIG. 29, the transition section 80 provides a substantially continuous contour 88 between the fixed structure 14 of the fuselage 18 (FIG. 26) and the movable structure 16 of the horizontal stabilizer 42. The pair of torque rods 162 may facilitate incremental pivoting of the ribs 92 to provide the substantially continuous contour 88 between the fixed structure 14 and the movable structure 16 similar to that which is illustrated in FIG. 32.

Referring to FIG. 30, the rib 92 may include a forward tip 134*b* mounted on a rib forward end 98 and/or an aft tip 134*a* mounted on the rib aft end 100. Each one of the forward tips 134*b* and aft tips 134*a* may be pivotable relative to the rib 92 to which the tips 134*a*, 134*b* are mounted. In this regard, each one of the forward and aft tips 134*b*, 134*a* may be pivotable about a tip axis 154 which may be coaxial with or parallel to the rib longitudinal axis 96. In addition, the forward and aft tips 134*b*, 134*a* may be rotatably connected to the respective rib forward and aft ends 98, 100 by any suitable means including, but not limited to, the stud 132 and bore 146 arrangement described above with regard to FIGS. 13 and 19. Optionally, the forward and aft tips 134*b*, 134*a* shown in FIG. 30 may be secured to the respective rib forward and aft ends 98, 100 by means of encapsulation of the tips 134 by the skin panel 148 (FIG. 20) which may extend over the rib forward and aft ends 98, 100. The skin panel 148 may optionally be secured to the ribs 92 by one or more mechanical fasteners 156 (FIG. 25) and/or by adhesive 152 (FIG. 23) bonding.

Figure 31:
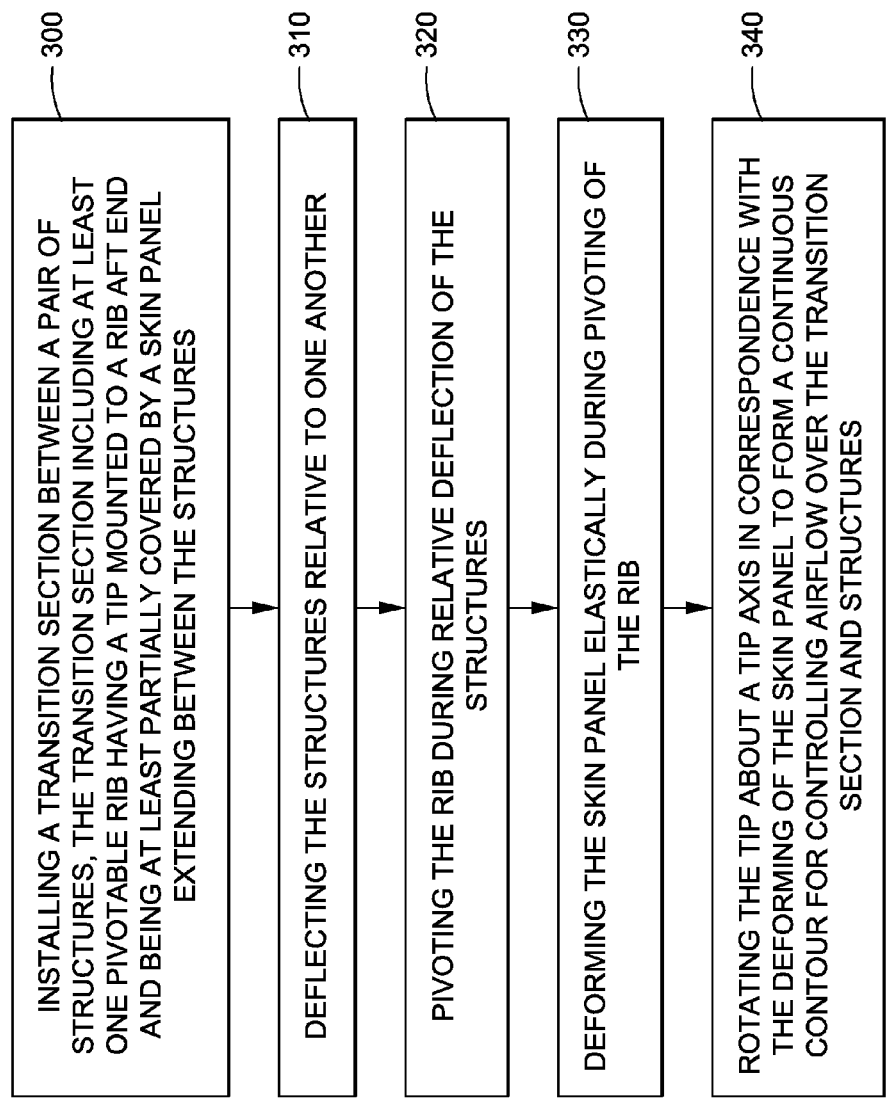
FIG. 31 is an illustration of a flow chart of a methodology comprising one or more operations for controlling airflow.

Referring to FIG. 31, shown is an illustration of a methodology which may comprise one or more steps or operations for controlling airflow over a control device 36 (FIG. 1) or aerodynamic member 12. In step 300, the methodology may comprise installing a transition section 80 between a pair of structures 14, 16 such as a movable structure 16 and a fixed structure 14 or a pair of movable structures 16. For example, FIGS. 7 and 8 illustrate the installation of a movable structure 16 configured as an aileron 46 and having a transition section 80 connected to an additional movable structure 16 configured as a trailing edge flap 48.

As was described above, the transition section 80 may include at least one rib 92 which may be pivotable relative to the structures 14, 16. For example, FIG. 19 illustrates a rib 92 having a tip 134 formed on a rib aft end 100 wherein the tip 134 may be rotatable about the tip axis 154. The transition section 80 may optionally include a plurality of ribs 92 which may be pivotable relative to the structures 14, 16. FIG. 20 illustrates a skin panel 148 that may at least partially cover the transition section 80. For example, the skin panel 148 may cover at least a portion of the tips 134 and/or at least a portion of the ribs 92.

Step 310 of the methodology of controlling the airflow may comprise deflecting the structures 14, 16 relative to one another. For example, FIGS. 5 and 6 illustrate the movable structure 16 configured as an aileron 46 being deflected in an upward direction relative to the fixed structure 14 comprising a wing 20. FIGS. 7 and 8 illustrate the movable structure 16 configured as an aileron 46 being deflected in an upward direction in contrast to the downward deflection of another movable structure 16 configure as a trailing edge flap 48.

Step 320 of the methodology may comprise pivoting the plurality of ribs 92 relative to one another and relative to the structures 14, 16 to which the transition section 80 may be mounted. The pivoting of the ribs 92 may occur during relative deflection of the structures 14, 16 as best seen in FIGS. 10 and 11. Step 330 may comprise deforming the skin panel 148 during pivoting of the ribs 92 in response to the deflection of the movable structure 16 relative to the fixed structure 14 or relative to another movable structure 16. For example, FIGS.

22 and 23 illustrate the deforming of the skin panel 148 during pivoting of the ribs 92. In this manner, the deforming of the skin panel 148 generates a smooth, continuous contour 88 of the transition section 80. The skin panel 148 may stretch elastically along the direction indicated by reference numeral 150 (FIG. 11) during pivoting of the ribs 92. The stretching of the skin panel 148 may be greatest at the trailing edge 84 of the transition section 80 as compared to a lesser degree of stretching that may occur at the leading edge 82 of the transition section 80.

Step 340 of the methodology of controlling the airflow may comprise rotating each one of the tips 134 (FIG. 19) about the respective tip axes 154 in correspondence with the deformation of the skin panel 148 during deflection of the structures 14, 16 relative to one another. In this regard, the tips 134 of each of one of the ribs 92 may be rotated about the respective tip axes 154 such that the tips 134 are oriented into substantial alignment with the skin panel 148. FIG. 23 illustrates the incrementally increasing pivoting of the ribs 92 along a direction from the fixed structure 14 on the left-hand side of the transition section 80 in FIG. 23 to an approximate midpoint of the transition section 80 at which point the pivoting of the ribs 92 may incrementally decrease until the transition section 80 interfaces with the movable structure 16. A similar incrementally pivoting arrangement may occur for a transition section 80 mounted between a pair of movable structures 16.

The incremental pivoting of the ribs 92 may occur such that the ribs 92 immediately adjacent to or nearest the structures are pivoted to cause the skin panel 148 to be substantially tangent to the structure surface 68 at an interface 70 between the transition section 80 and the structure. For example, FIGS. 21-22 illustrate the skin panel 148 forming a substantially tangent relation to the structure surfaces 68 of the movable structure 16 and fixed structure 14. In an embodiment, the tangent relation of the skin panel 148 to the structure surfaces 68 may be effectuated by the rib torquing mechanism 160 (FIG. 10) which may incrementally increase and decrease the angle of pivoting of the ribs 92.

In this manner, the skin panel 148 (FIG. 21) may be substantially tangent to the structure surfaces 68 at the interfaces between the transition section 80 and the structures 14, 16. The torquing of the ribs 92 may incrementally pivot the ribs 92 in a manner to generate a substantially continuous contour 88 between the structures 14, 16 during relative deflection thereof. In an embodiment, the rib torquing mechanism 160 (FIG. 10) may comprise a torque rod 162 that may extend between the structures 14, 16. The torque rod 162 may by coupled to one or more of the ribs 92 such as the rib forward end 98 as illustrated in FIG. 10. The ribs 92 may be pivoted by the torque rod 162 about a rib pivot axis 94. During pivoting of the ribs 92, the torque rod 162 may be bent or twisted relative to a rib pivot axis 94 as illustrated in FIG. 12.

As shown in FIG. 12, a rod attach portion 164 of the torque rod 162 may be restrained against lateral movement relative to the structures 14, 16 at a rod-structure junction 170 (FIG. 11). By restraining or preventing lateral movement of the torque rod 162 relative to the structures 14, 16, the skin panel 148 may be substantially tangent to the structure surfaces 68 during relative deflection of the structures 14, 16. In this manner, the torque rod 162 may provide a substantially smooth and/or continuous contour 88 between the structures 14, 16.

As can be seen in FIG. 12, the torque rod 162 may also be axially slidable relative to at least one of the side edges 66, 64 of the structure to accommodate changes in distance between the structures 14, 16. In addition, and referring to FIG. 22, the skin panel 148 may be maintained in contact with the rib 92 at a tangent to the rounded shape 116 of one of the rib upper and lower edges 106, 108. In this manner, a stepped surface (not shown) of the skin panel 148 may be avoided during relative deflection of the structures 14, 16. Such stepped surface may otherwise occur if the ribs 92 were provided with a planar shape 114 (FIG. 21) at the rib aft end 100. However, the rounded shape 116 of the rib upper and lower edges 106, 108 may facilitate a smooth contour of the skin panel 148 during relative deflection of the structures 14, 16.

Referring now to FIG. 32, shown is an illustration of a methodology comprising one or more operations or steps for forming or constructing a movable structure 16 such as of an aircraft 10 (FIG. 1). The one or more steps or operations may optionally include step 400 comprising installing at least one rib 92 between the movable structure 16 and the fixed structure 14. Alternatively, the methodology may comprise installing at least one rib 92 or a plurality of ribs 92 between the movable structure 16 and an additional one of the movable structures 16 as illustrated in FIGS. 7-8.

Step 410 may comprise mounting one or more of the ribs 92 of the transition section 80 such that each one of the ribs 92 is pivotable about a rib pivot axis 94 as described above with regard to FIG. 10. FIG. 10 illustrates the rib pivot axis 94 being coincident or coaxial with the rib pivot axis 94 of the movable structure 16. Step 420 may comprise mounting a tip 134 to at least one of the ends 98, 100 of at least one of the ribs 92. The tips 134 may be mounted in a manner such that the tip 134 is substantially freely rotatable about a tip axis 154. As was indicated above, the tip axis 154 of each one of the tips 134 may be oriented in substantially non-parallel relation to the rib pivot axis 94. In this regard, the tip axis 154 of each one of the tips 134 may be oriented in substantial alignment with the rib longitudinal axis 96 (FIG. 13). However, the tip axis 154 may be oriented in any direction.

Step 430 of the methodology of forming the movable structure 16 may comprise covering at least a portion of the tip 134 and/or a portion of the ribs 92 with an elastic or resiliently stretchable skin panel 148 in order to form a substantially continuous contour 88 between the structures 14, 16. For example, as illustrated in FIGS. 21-23, the skin panel 148 extends between the structures 14, 16 and may be attached to at least one of the structures 14, 16. In addition, the skin panel 148 may be placed in contacting relation with one or more of the ribs 92 and/or one or more of the tips 134. Deflection of the movable structure 16 may cause rotation of the tips 134 to maintain the tips 134 in substantial alignment with the skin panel 148. The skin panel 148 may stretch to form a substantially smooth or uniform contour between the movable structure 16 and the fixed structure 14 or between a pair of movable structures 16 as described above.

As shown in FIG. 11, the rib torquing mechanism 160 may be coupled to one or more of the ribs 92 for incrementally pivoting the ribs 92 during relative deflection of the structures 14, 16. For example, as indicated above, the ribs 92 may be incrementally pivoted in a manner to maintain the skin panel 148 substantially tangent to the structure surfaces 68 at an interface 70 between the transition section 80 and the structures 14, 16. In this regard, the methodology may include extending a torque rod 162 (FIG. 12) between the structures 14, 16 and coupling the torque rod 162 to the ribs 92. The torque rod 162 may be mounted in a manner to substantially prevent lateral movement of the torque rod 162 at the rod-structure junctions 170. The torque rod 162 may optionally be mounted to facilitate axial sliding movement of the torque rod 162 relative to at least one of the structures 14, 16 during relative deflection thereof. In this manner, the axial sliding of the torque rod 162 may accommodate changes in distance between side edges 64, 66 of the structures 14, 16 during relative deflection.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A transition section forming a continuous contour across a gap between a pair of structures which in use are subject to fluid flow, comprising:
   at least one rib mounted within the gap and being pivotable relative to the structures;
   a tip mounted to an end of the rib which is rotatable about a longitudinal axis of the rib; and
   a skin at least partially covering the tip and at least one structure, and being deformable during pivoting of the rib; the tip rotates about the longitudinal rib axis into substantial alignment with the skin in response to pivoting of the rib.

2. The transition section of claim 1 wherein the tip comprises:
   an aft tip mounted to an aft end of the rib; or
   a forward tip mounted to a forward end of the rib.

3. The transition section of claim 1 wherein:
   the at least one rib comprises a plurality of ribs.

4. The transition section of claim 3 further comprising:
   a rib torquing mechanism for incrementally pivoting the ribs during relative deflection of the pair of structures.

5. The transition section of claim 4 wherein:
   The rib torquing mechanism incrementally pivots the rib such that the skin immediately adjacent to one of the structures of the pair at an interface between the transition section and the structure has a substantially continuous surface.

6. The transition section of claim 4 wherein:
   the rib torquing mechanism comprises a torque rod extending between the pair of structures and being coupled to at least one of the ribs.

7. The transition section of claim 1 wherein the pair of structures comprise:
   a pair of movable structures; or
   a movable structure and a fixed structure.

8. An aircraft, comprising:
   a transition section forming a continuous contour across a gap between a pair of structures, the transition section including:
   at least one rib mounted within the gap is pivotable in response to a relative deflection of the pair of structures;
   a tip mounted to an end of the rib which is rotatable about a longitudinal axis of the rib; and a skin at least partially covering the tip and being deformable during pivoting of the rib; the tip rotates about the longitudinal rib axis into substantial alignment with the skin in response to pivoting of the rib.

9. The aircraft of claim 8 wherein the transition section includes:
   a plurality of the ribs; and
   a rib torquing mechanism for incrementally pivoting the ribs during relative deflection of the pair of structures.

10. The aircraft of claim 9 wherein:
    the rib torquing mechanism comprises a torque rod which extends between the pair of structures and is coupled to at least one of the ribs.

11. The aircraft of claim 8 wherein the pair of structures comprise:
    a pair of movable structures; or
    a movable structure and a fixed structure.

12. The aircraft of claim 11 wherein:
    the fixed structure comprises:
    a wing, a fuselage, a vertical stabilizer, or a horizontal stabilizer;
    the movable structure or pair of movable structures comprise:
    an aileron, a spoiler, a trailing edge flap, a leading edge slat, a rudder, an elevator, an elevon, a trim tab, a canard, a propeller, a rotor blade, or a control tab.

13. A method of controlling airflow, comprising the steps of:
    installing a transition section between a pair of structures, the transition section including at least one pivotable rib having a tip mounted to an end of the rib, the tip being at least partially covered by a skin;
    deflecting the pair of structures relative to one another;
    pivoting the at least one pivotable rib during relative deflection of the pair of structures;
    deforming the skin elastically during pivoting of the rib; and
    rotating the tip about a longitudinal axis of the rib into substantial alignment with the skin during deformation of the skin in response to pivoting of the rib.

14. The method of claim 13 wherein the step of pivoting the rib comprises:
    pivoting the rib with a rib torquing mechanism.

15. The method of claim 14 wherein the transition section includes a plurality of pivotable ribs coupled to the rib torquing mechanism; and the step of pivoting the at least one pivotable rib comprises pivoting the ribs incrementally.

16. The method of claim 15 wherein at least one of the pair of structures includes a structure surface, the step of pivoting the ribs incrementally comprises:
    pivoting the ribs such that the skin immediately adjacent one of the structures of the pair at an interface between the rib and the structure has a substantially continuous surface.

17. The method of claim 16 wherein the rib torquing mechanism comprises a torque rod extending between the pair of structures and is coupled to the ribs, the step of pivoting the ribs incrementally comprises:
    twisting the torque rod relative to a rib pivot axis.

18. The method of claim 17 wherein the step of twisting the torque rod comprises:
    restraining the torque rod against lateral movement relative to at least one of the pair of structures at a rod-structure junction.

19. The method of claim 17 wherein the step of twisting the torque rod comprises:
    sliding the torque rod axially relative to at least one of the pair of structures.

20. A method of forming a transition section subject to fluid flow in use, comprising the steps of:
    installing at least one rib between a movable structure and at least one of a fixed structure or an additional movable structure;
    mounting the rib such that the rib is pivotable about a rib pivot axis;
    mounting a tip to an end of the rib such that the tip is rotatable about ft longitudinal axis of the rib;
    and covering at least a portion of the tip with a skin such that the tip rotates into substantial alignment with the skin in response to a relative deflection between the moving structure and the fixed or the additional movable structure.

21. The method of claim 20 wherein the steps of installing and mounting the rib comprise:
    installing a plurality of the ribs such that the ribs are pivotable about the rib pivot axis.

22. The method of claim 21 further comprising the step of:
    coupling a rib torquing mechanism to the ribs in a manner causing the ribs to incrementally pivot during relative deflection between the moving structure and the fixed or the additional movable structure.

23. The method of claim 22 wherein the step of mounting the ribs comprises:
    mounting the ribs such that the skin immediately adjacent to one of the structures of the pair at an interface between the rib and the structure has a substantially continuous surface.

24. The method of claim 22 wherein the step of coupling a rib torquing mechanism to the ribs comprises:
    extending a torque rod between the movable structure and the fixed or the additional movable structure; and coupling the torque rod to the ribs.

25. The method of claim 20 further comprising the step of:
    forming at least a portion of one of the rib upper and lower edges with a rounded shape such that the skin is maintained in contact with the rib at a tangent to the rounded shape during relative deflection of the moving structure and the fixed or the additional movable structure.

* * * * *